Oct. 15, 1957
A. NOVICK
2,809,695
DIE PRESSES
Filed Nov. 8, 1949
29 Sheets-Sheet 6
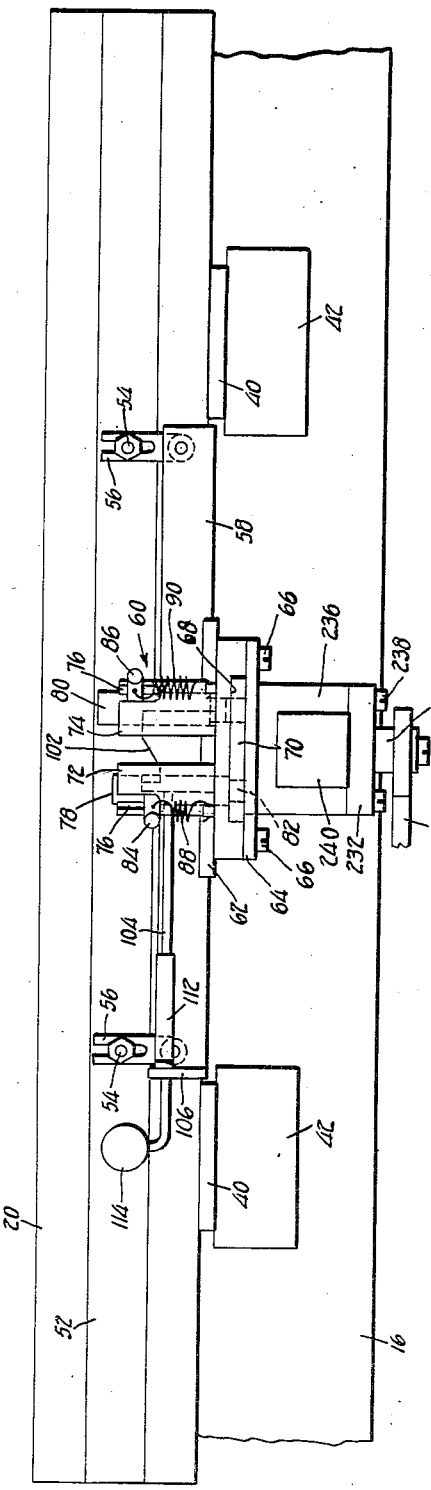
INVENTOR.
Abraham Novick
BY
Moses, Nolte, Crews & Berry
ATTORNEYS Oct. 15, 1957 A. NOVICK 2,809,695
DIE PRESSES
Filed Nov. 8, 1949 29 Sheets-Sheet 7
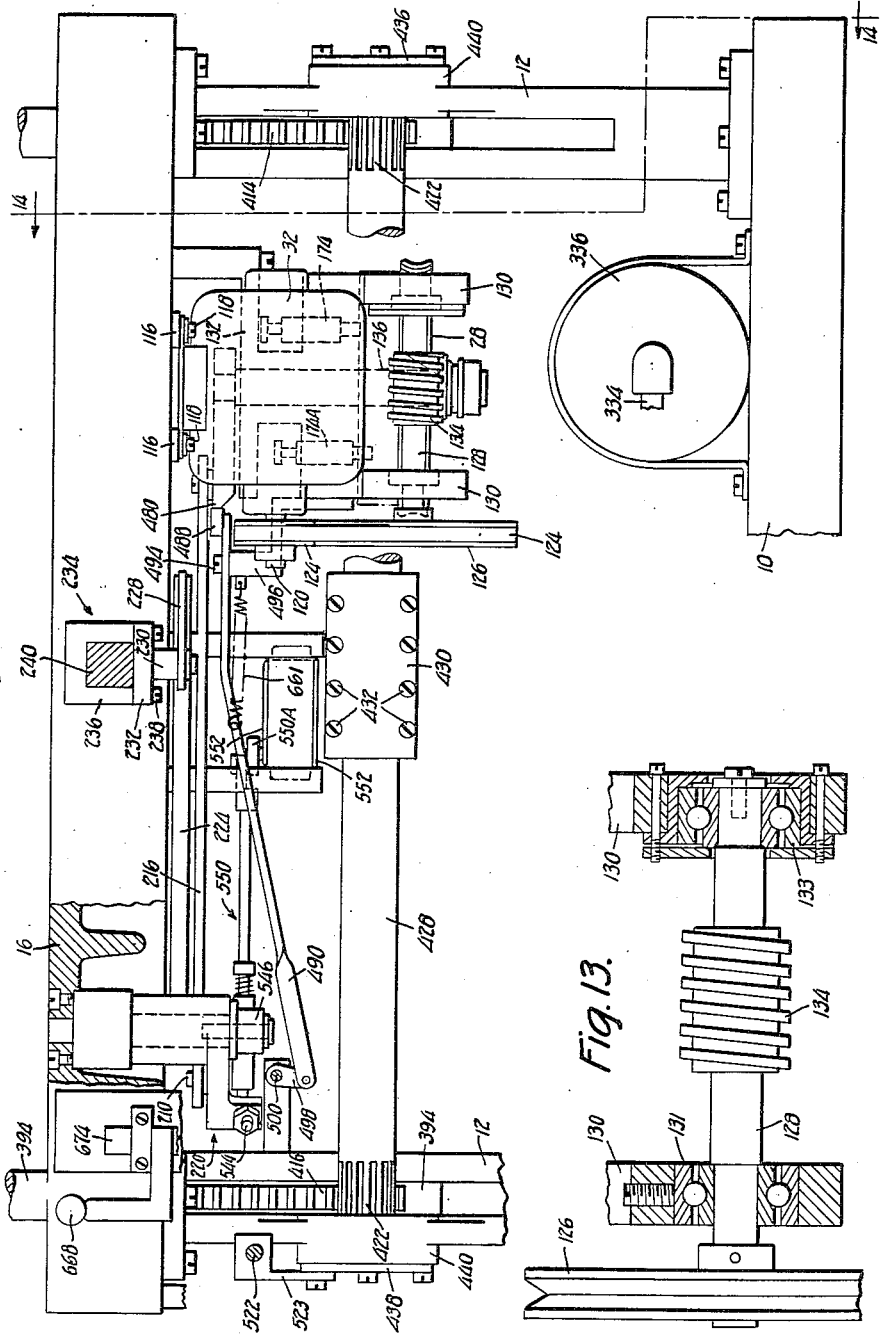
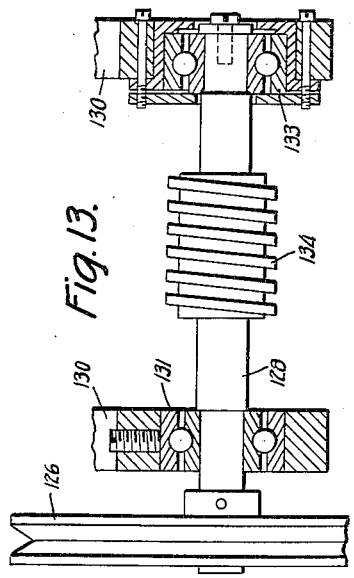
INVENTOR.
Abraham Novick
BY
Moses, Nolte, Crews & Berry
ATTORNEYS Oct. 15, 1957
A. NOVICK
2,809,695
DIE PRESSES
Filed Nov. 8, 1949
29 Sheets-Sheet 8
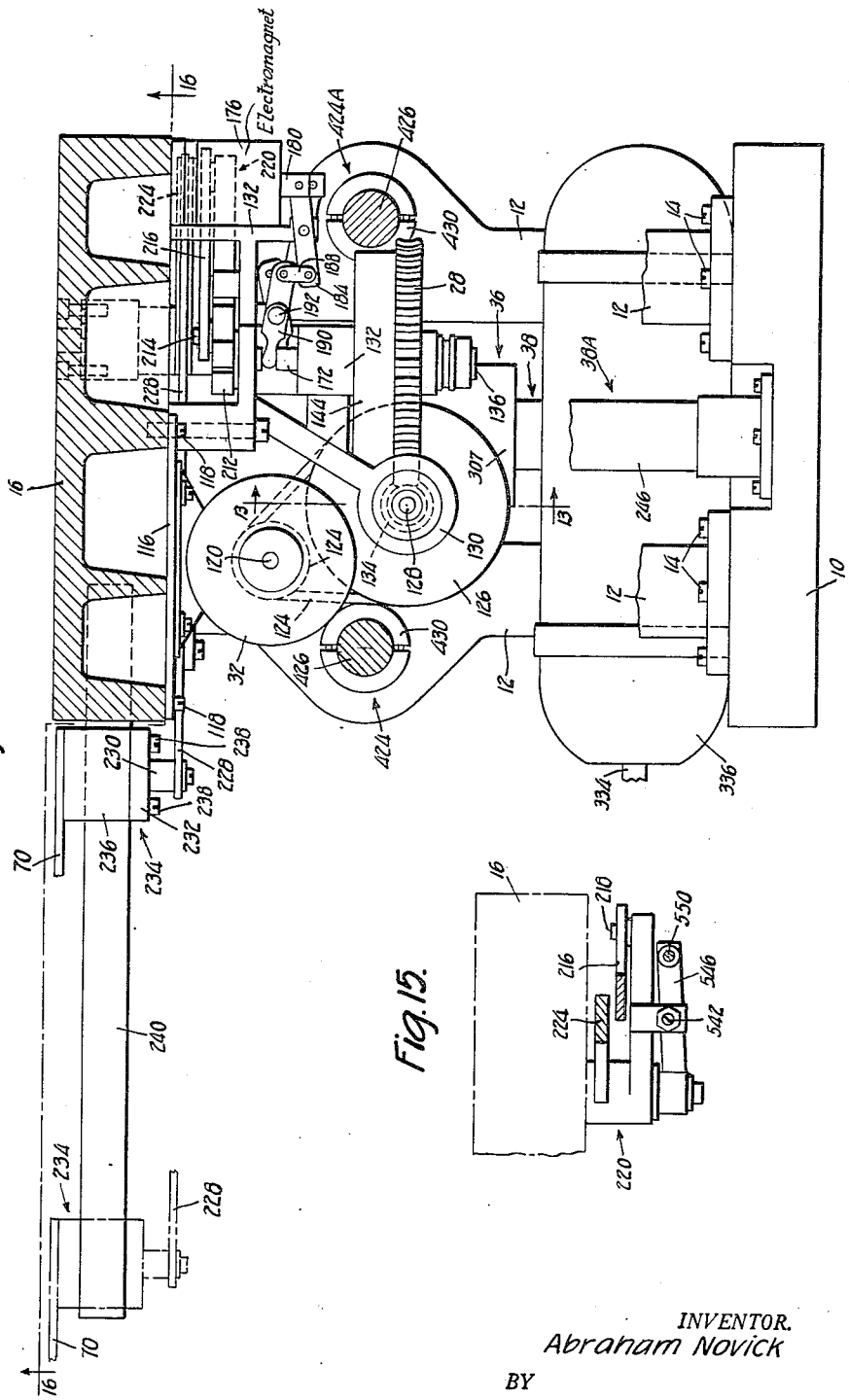
INVENTOR.
Abraham Novick
BY
Moses, Nolte, Crews, & Berry
ATTORNEYS INVENTOR.
Abraham Novick
BY
ATTORNEYS

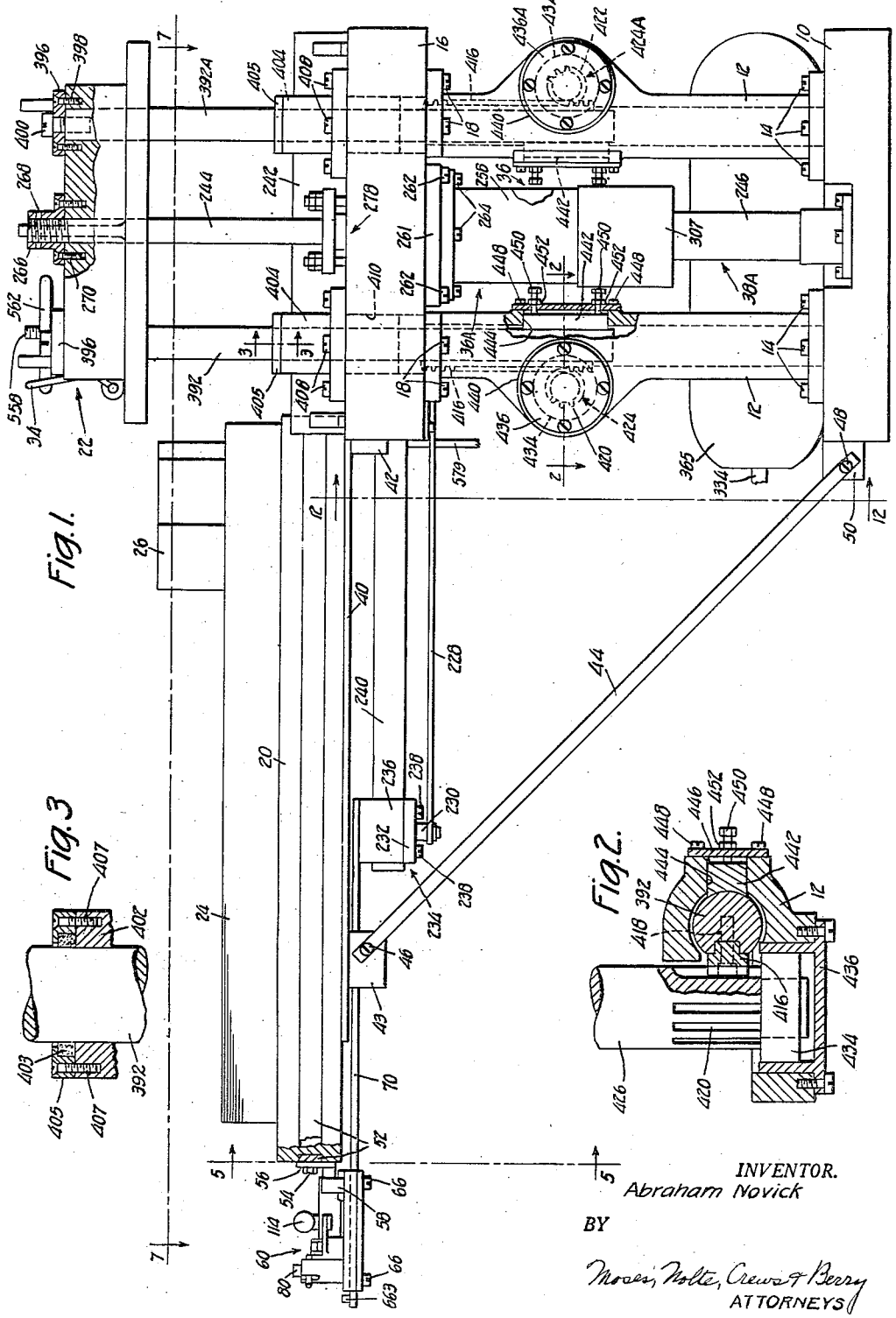

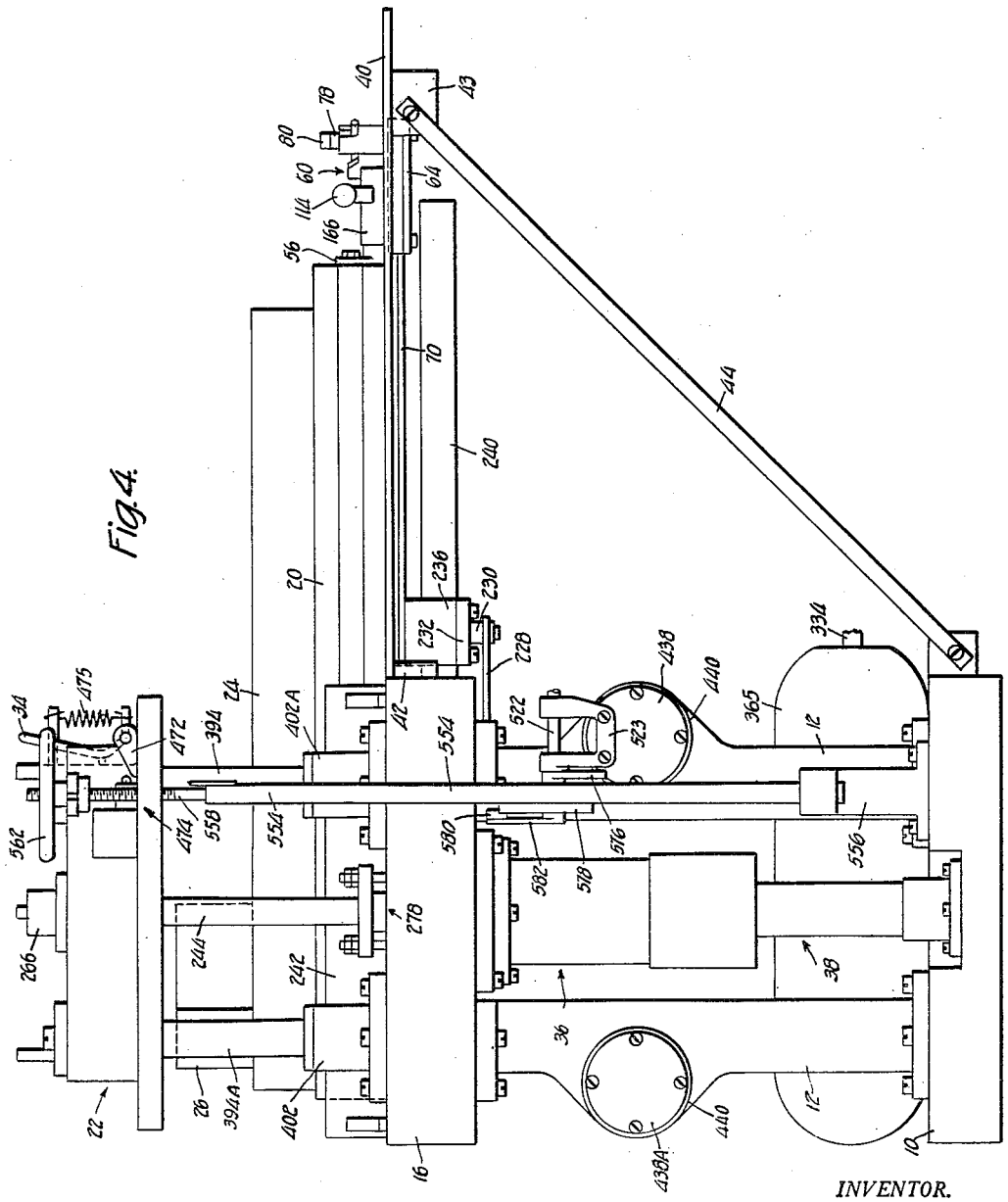

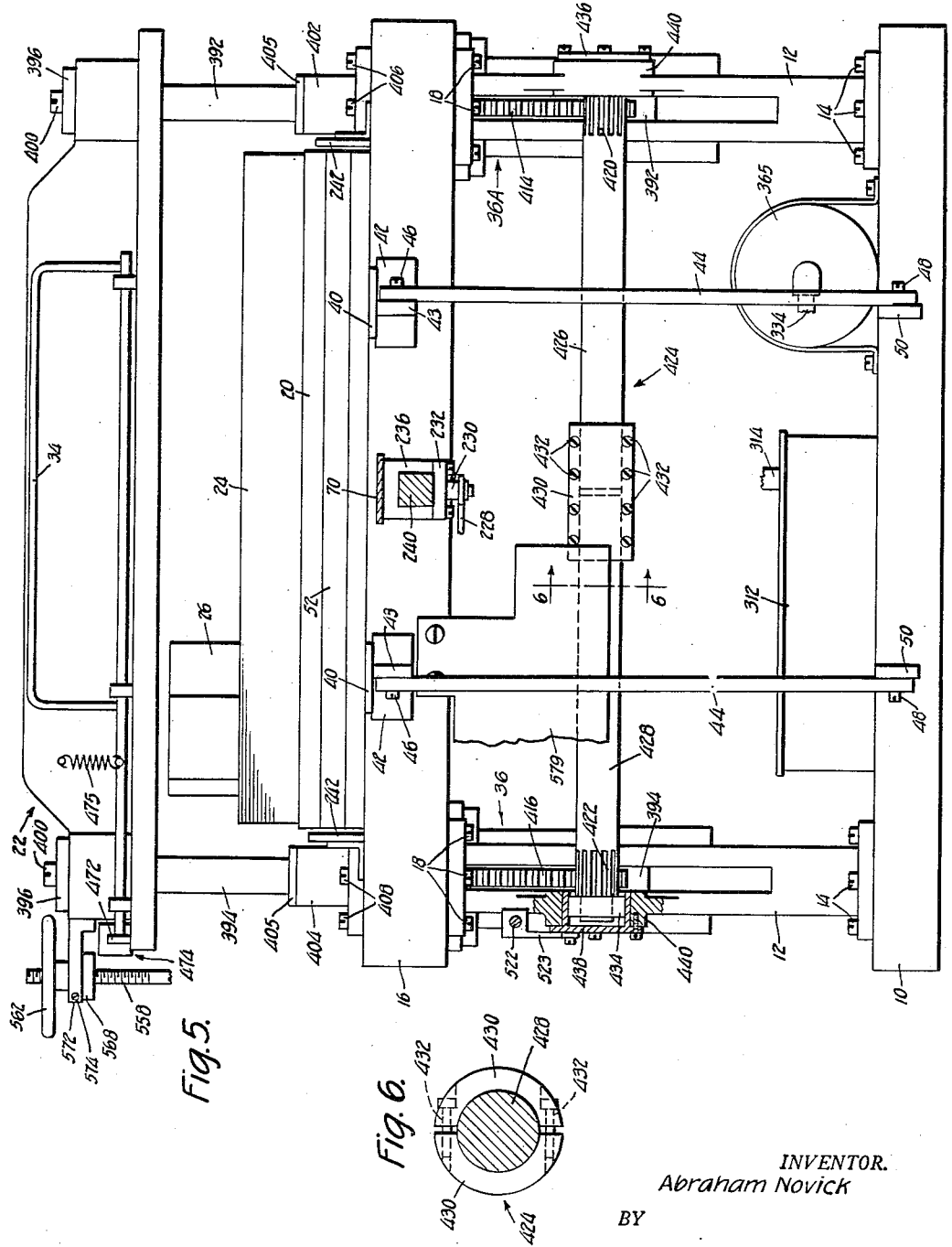

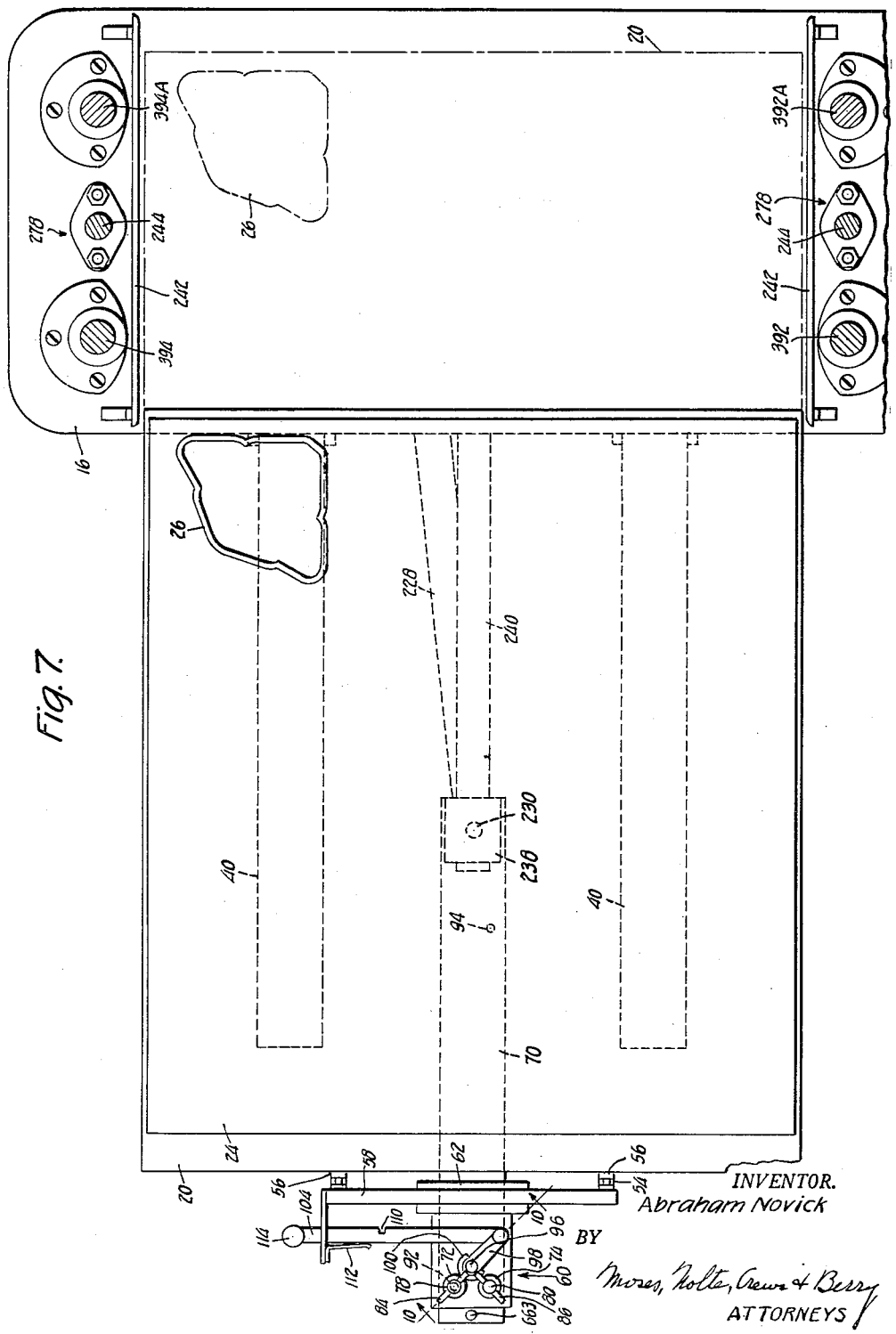

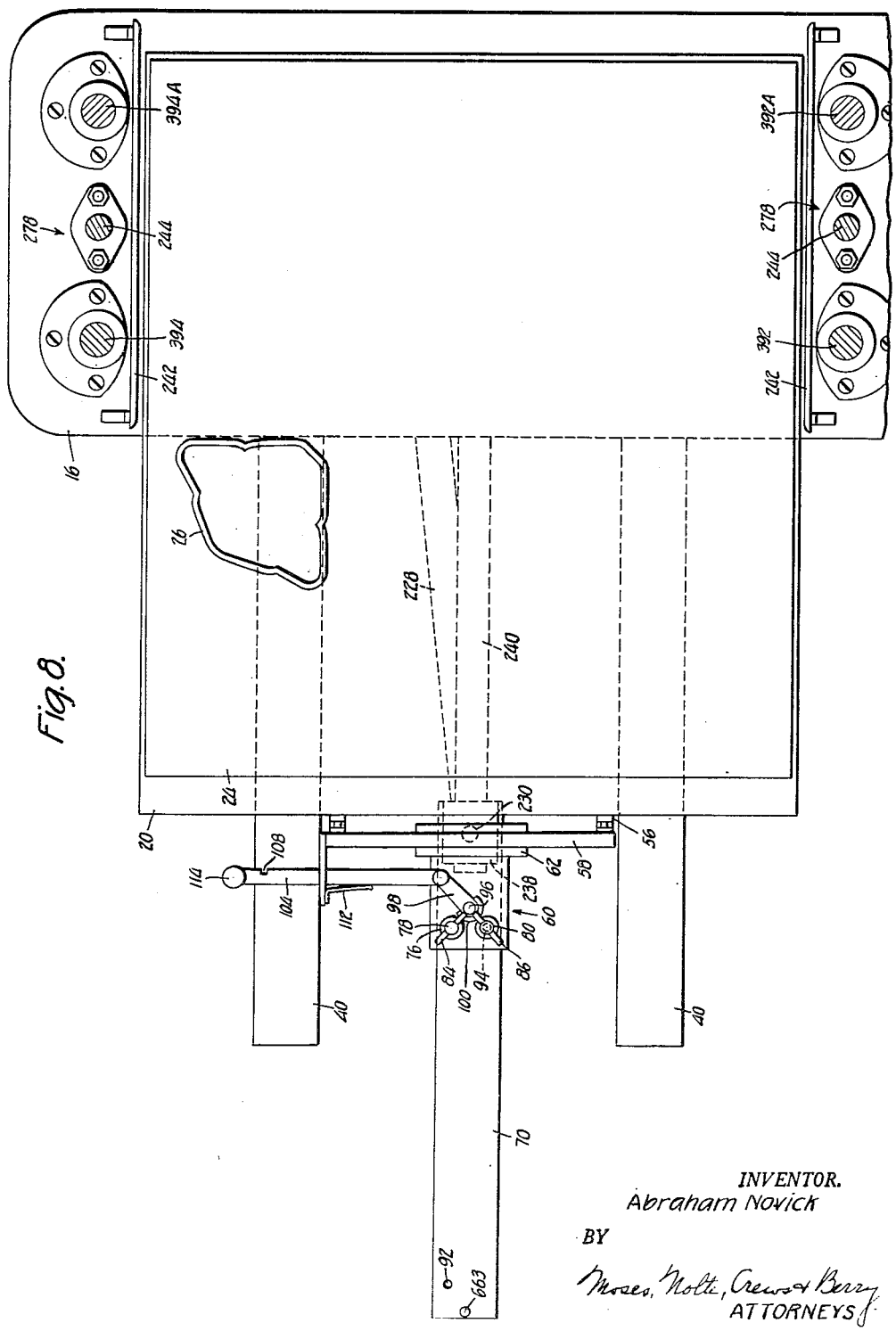

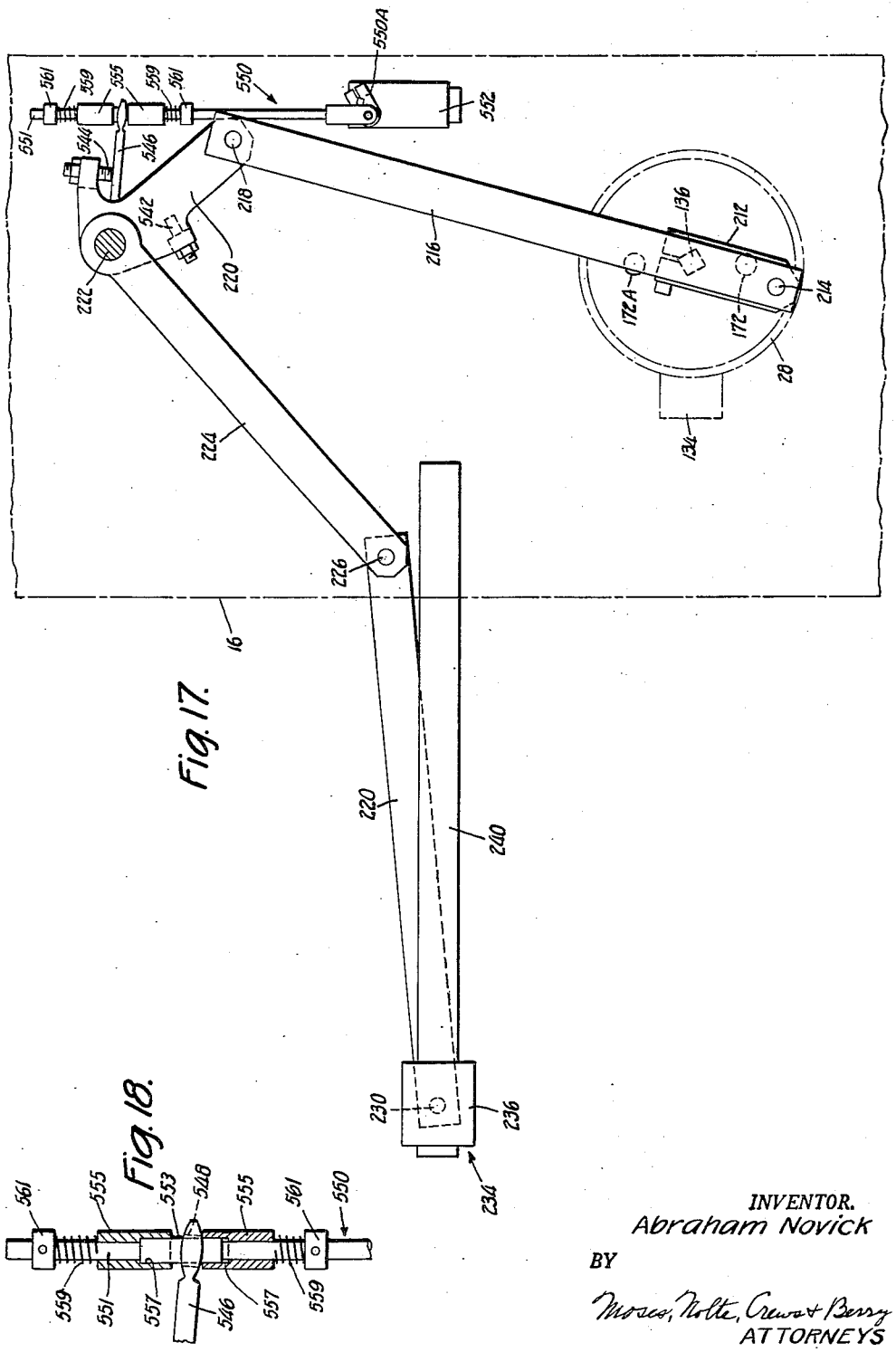

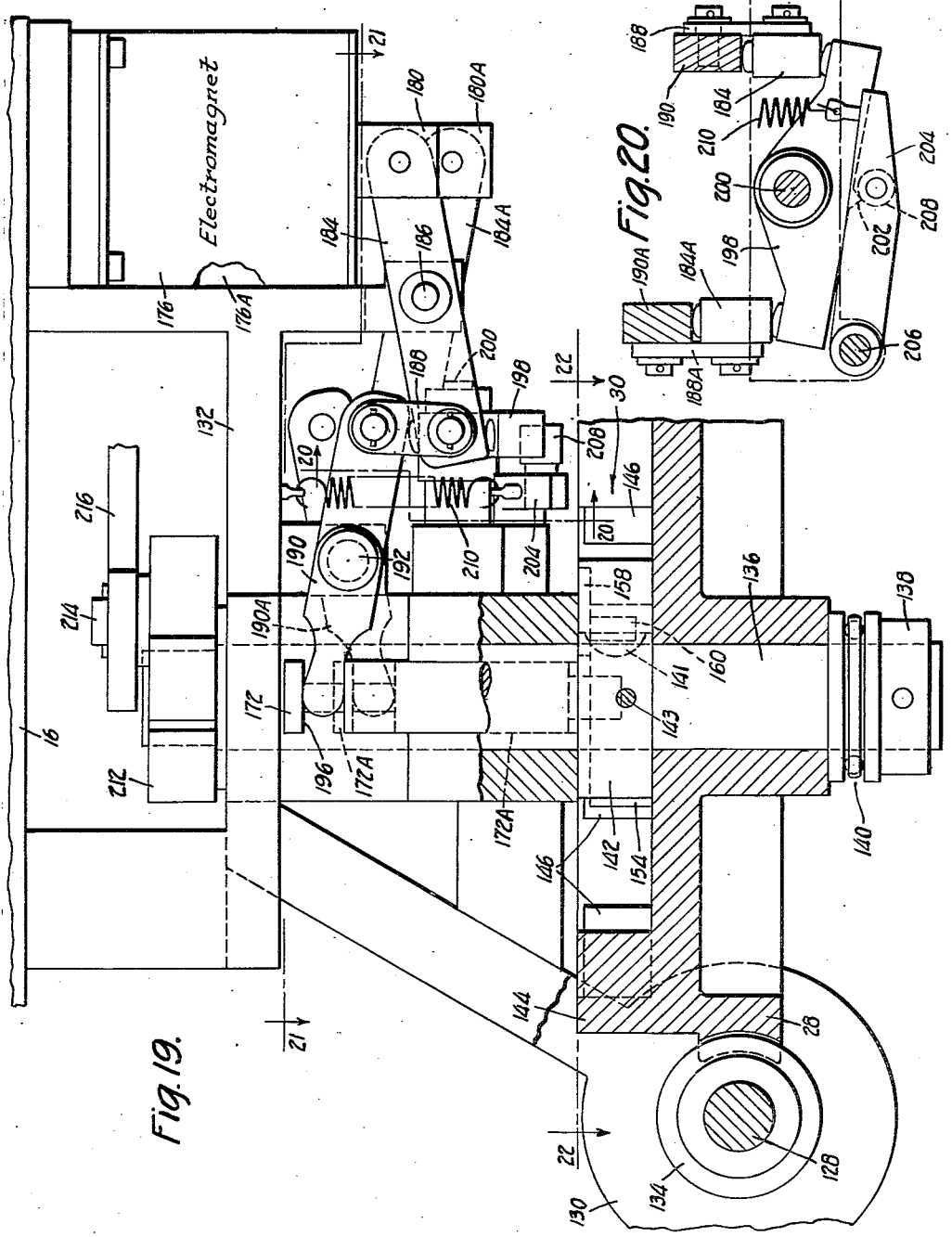

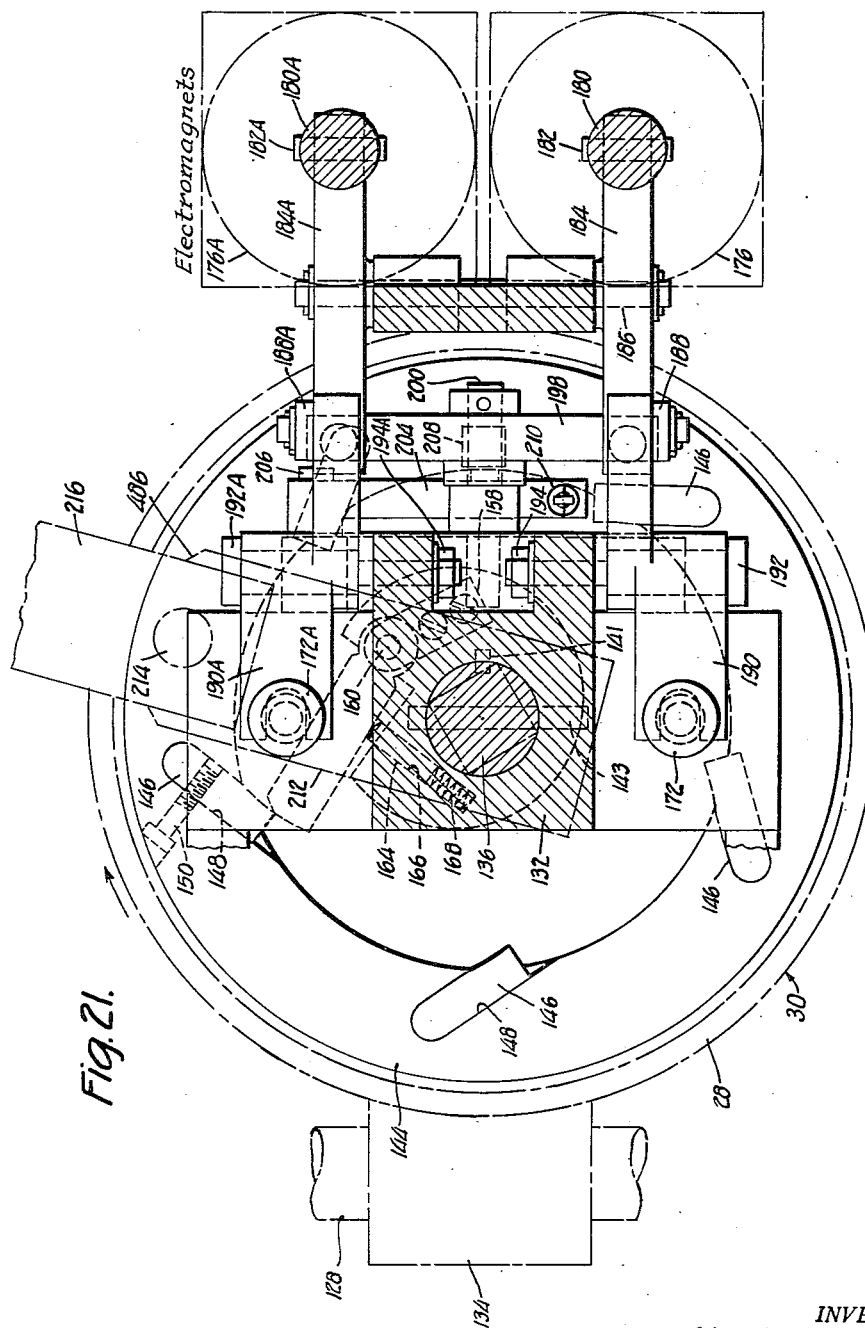

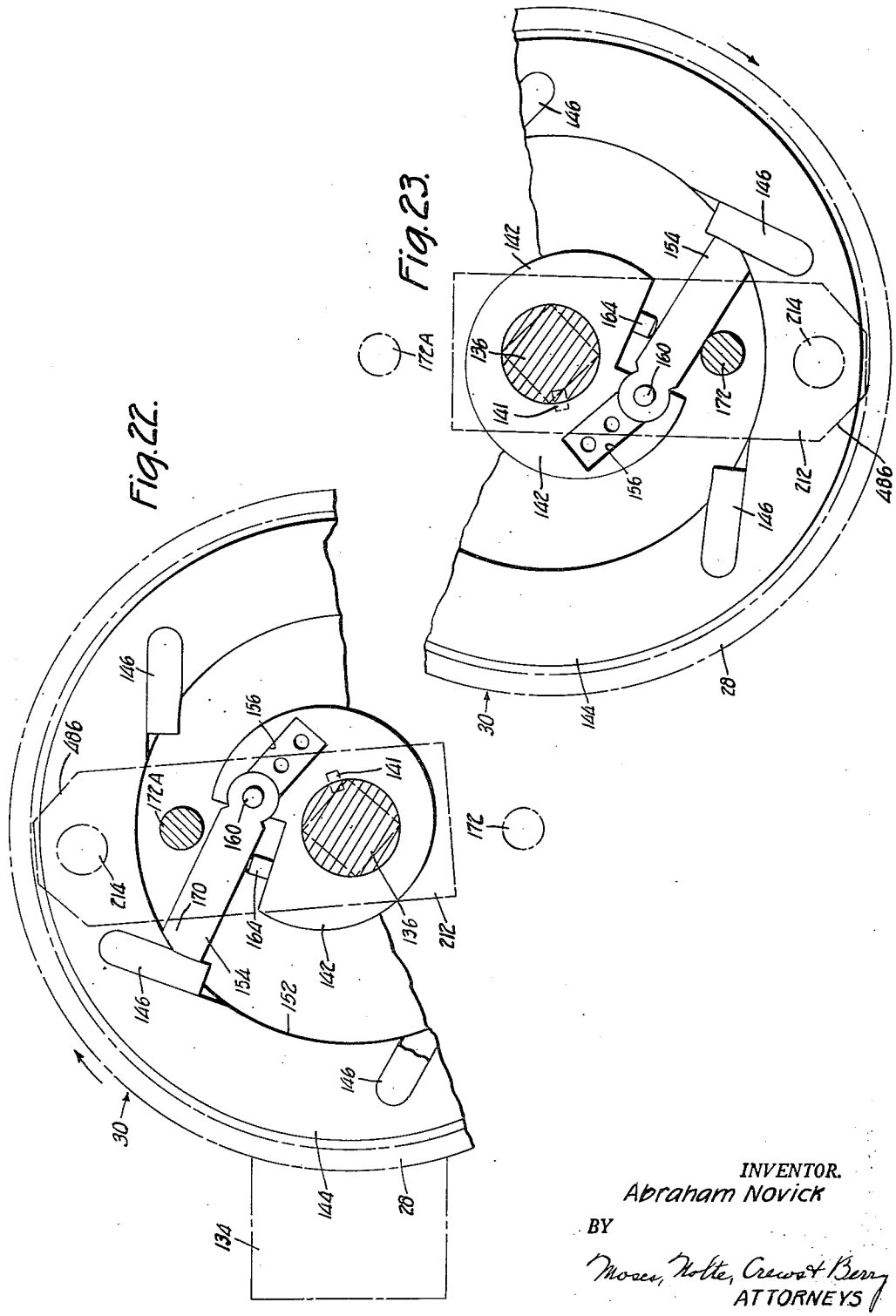

Oct. 15, 1957 A. NOVICK 2,809,695
DIE PRESSES
Filed Nov. 8, 1949 29 Sheets-Sheet 14

INVENTOR.
Abraham Novick
BY
Moses, Nolte, Crews & Berry
ATTORNEYS

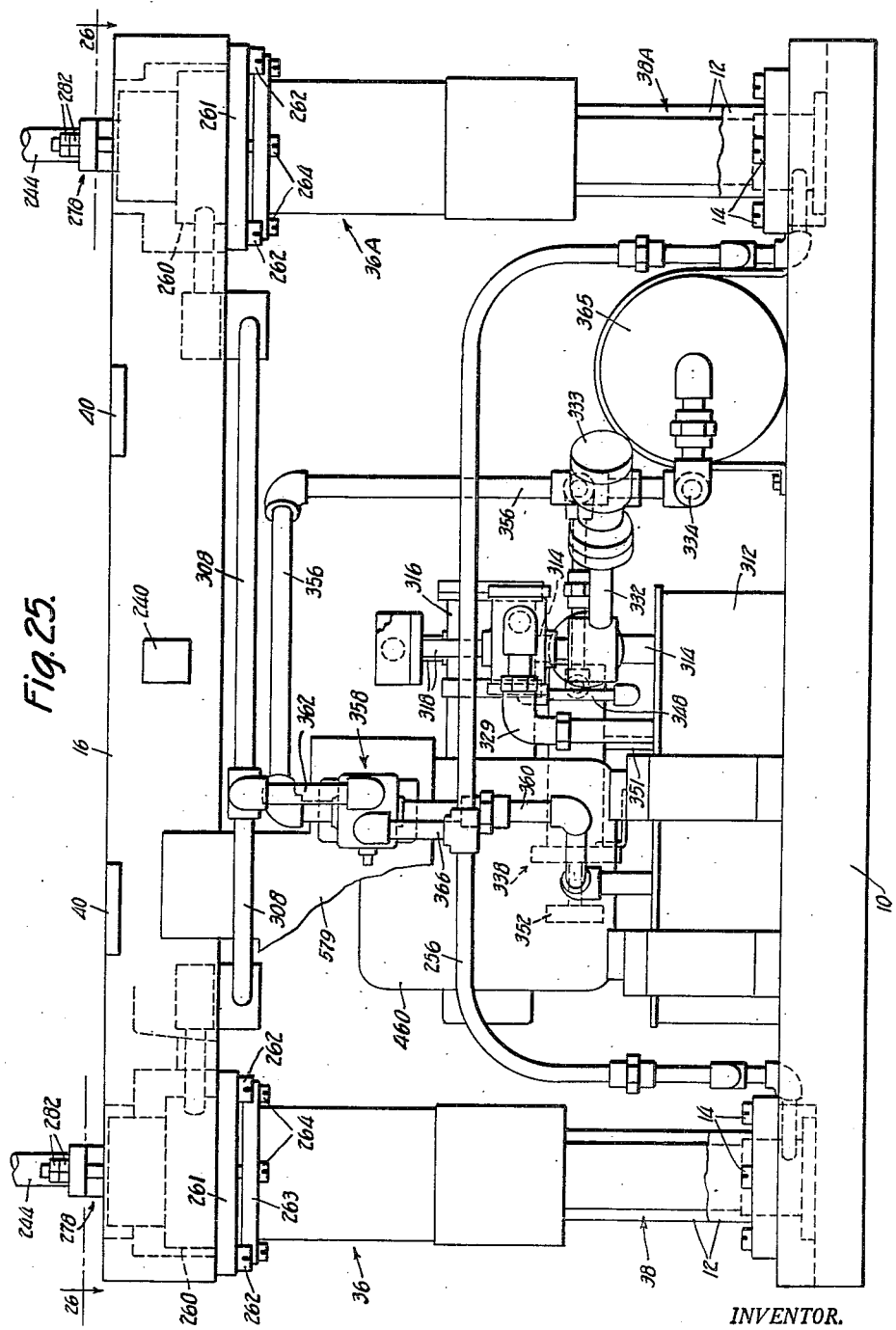

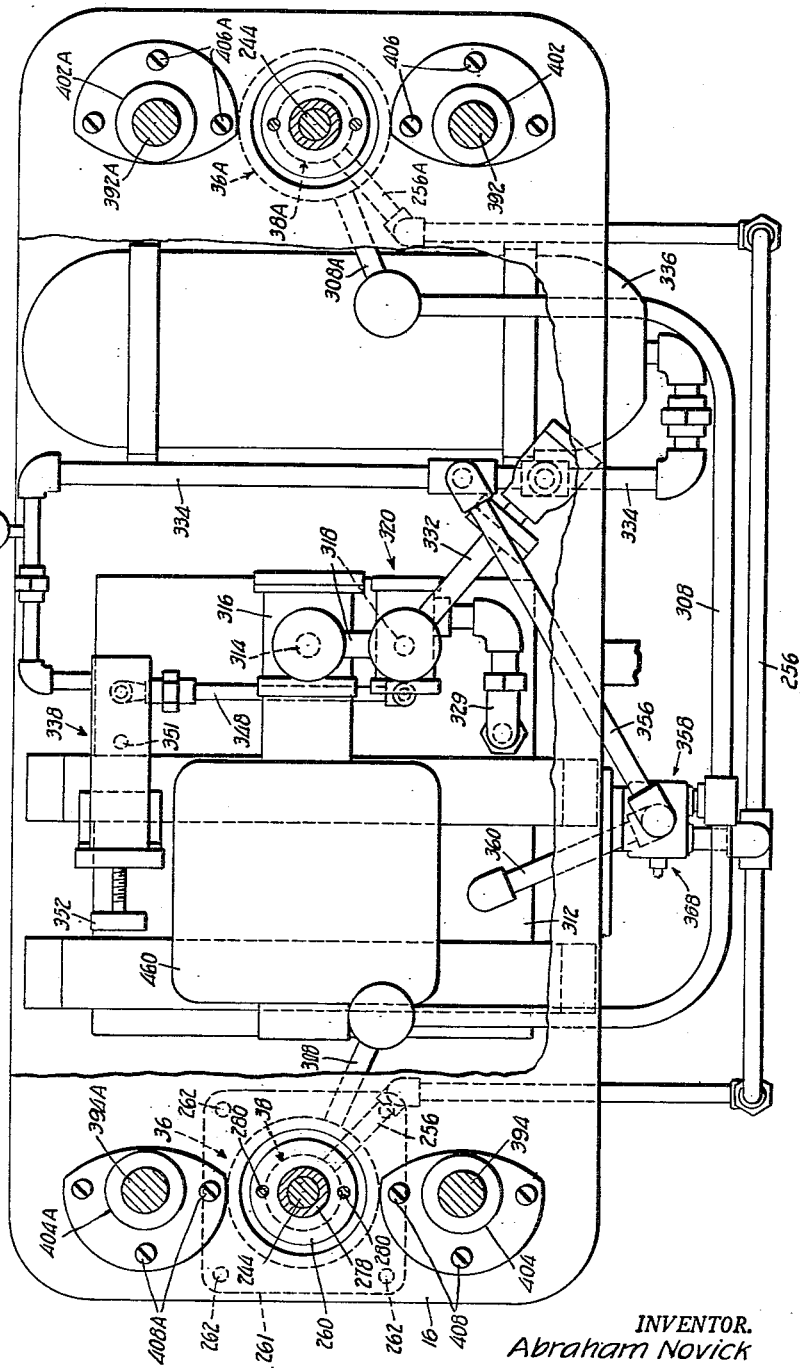

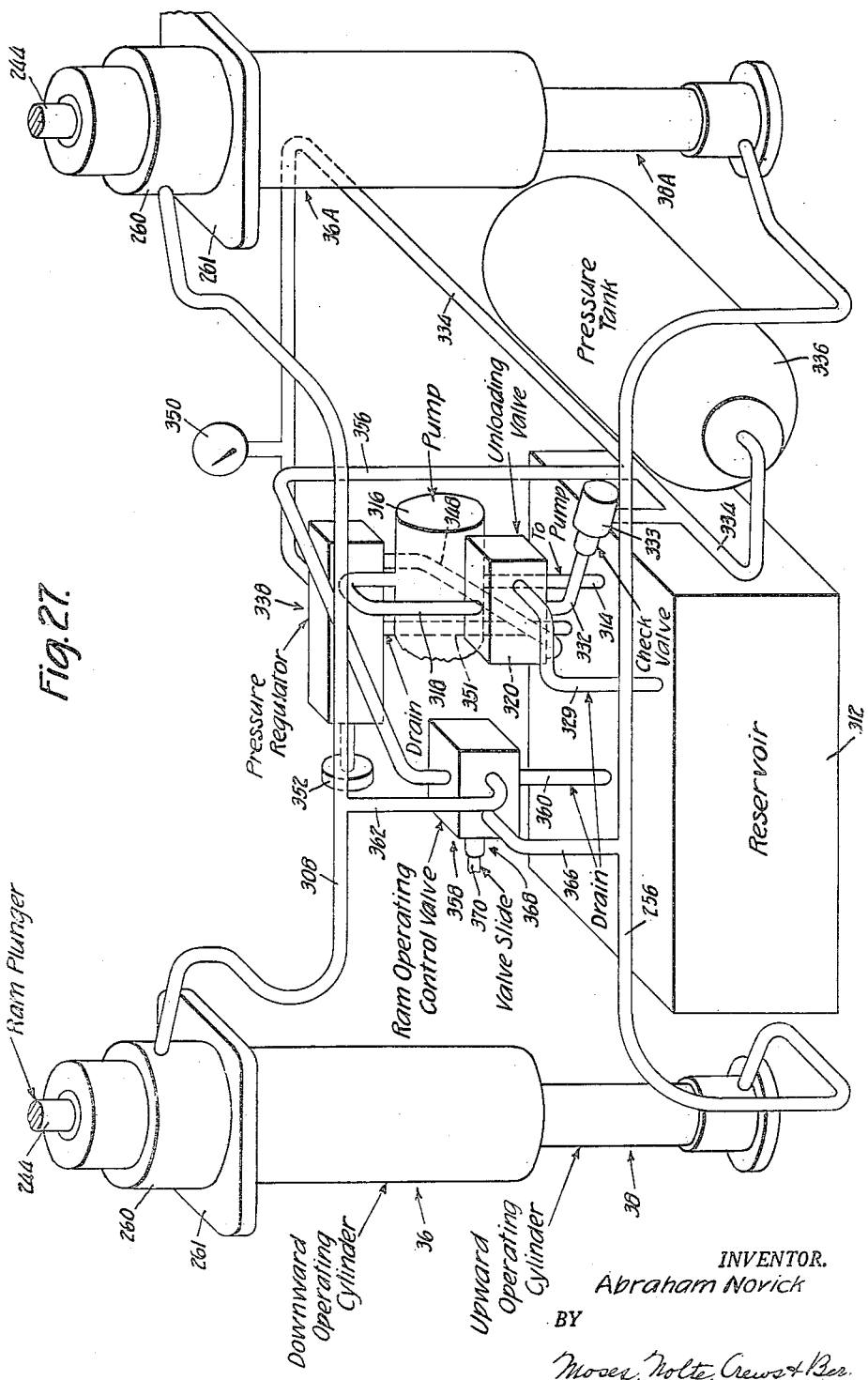

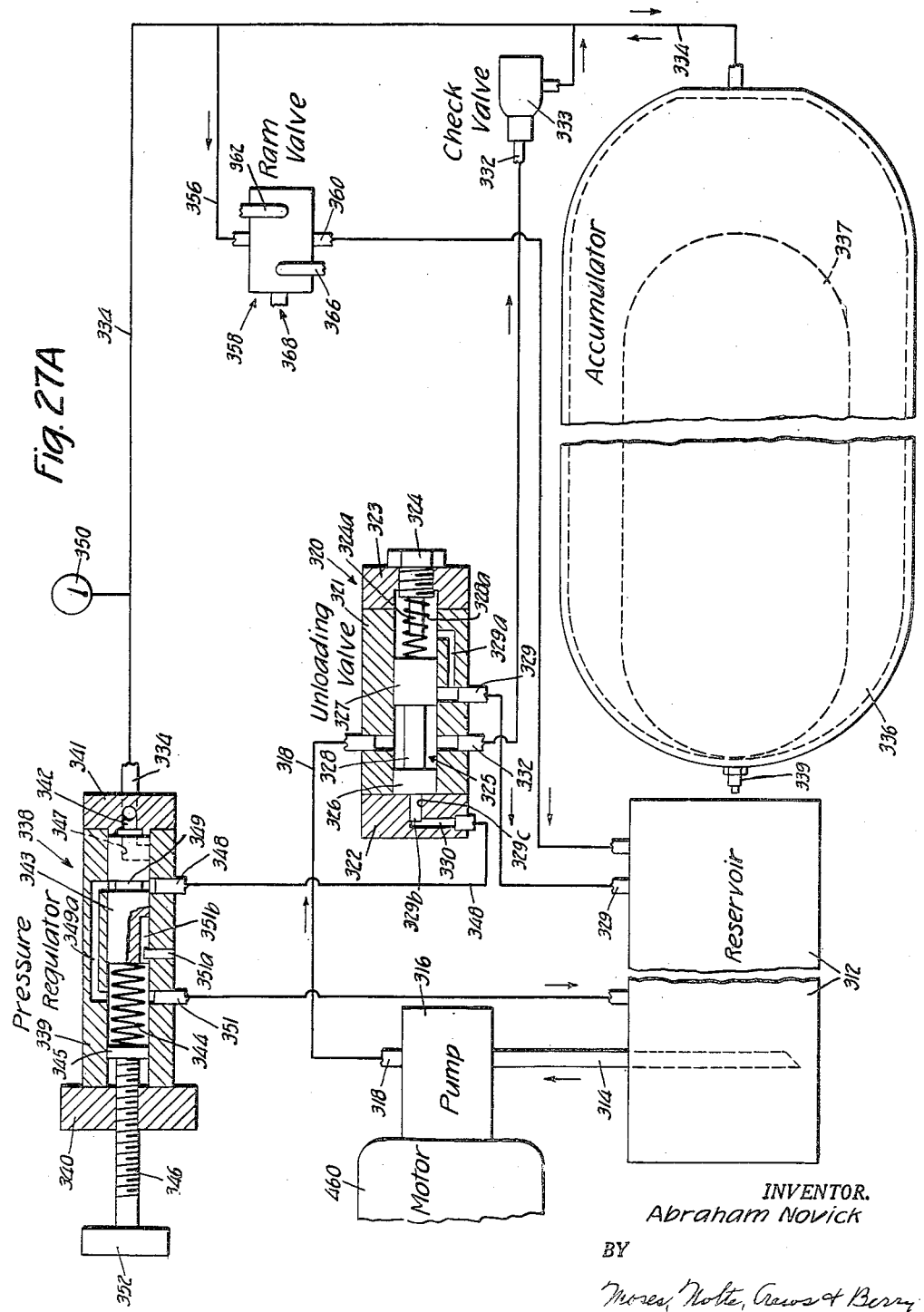

Oct. 15, 1957 A. NOVICK 2,809,695
DIE PRESSES
Filed Nov. 8, 1949 29 Sheets-Sheet 19
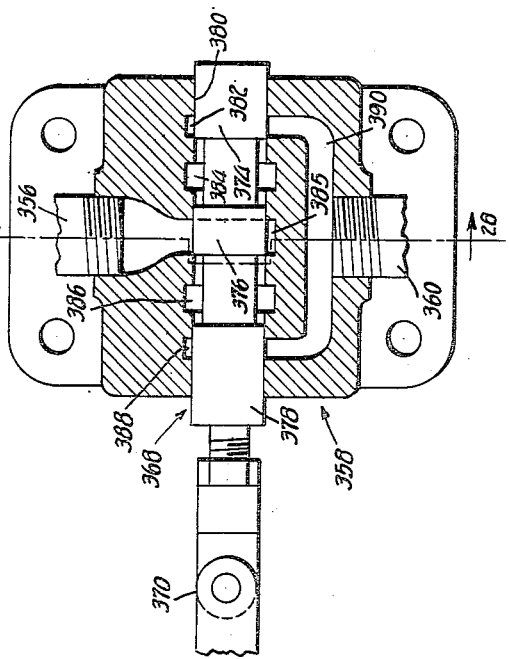
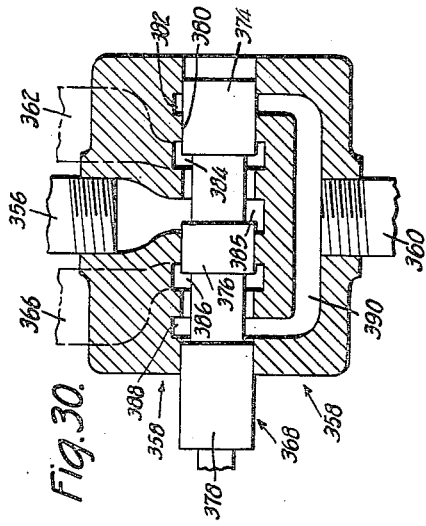
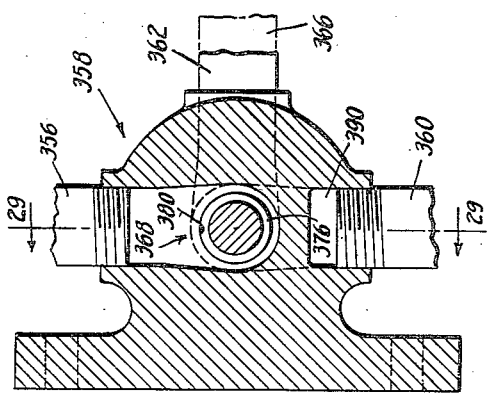
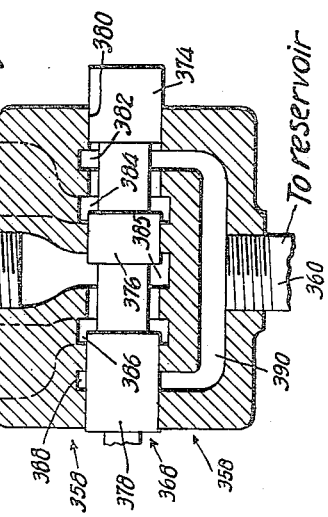
INVENTOR.
Abraham Novick
BY
ATTORNEYS

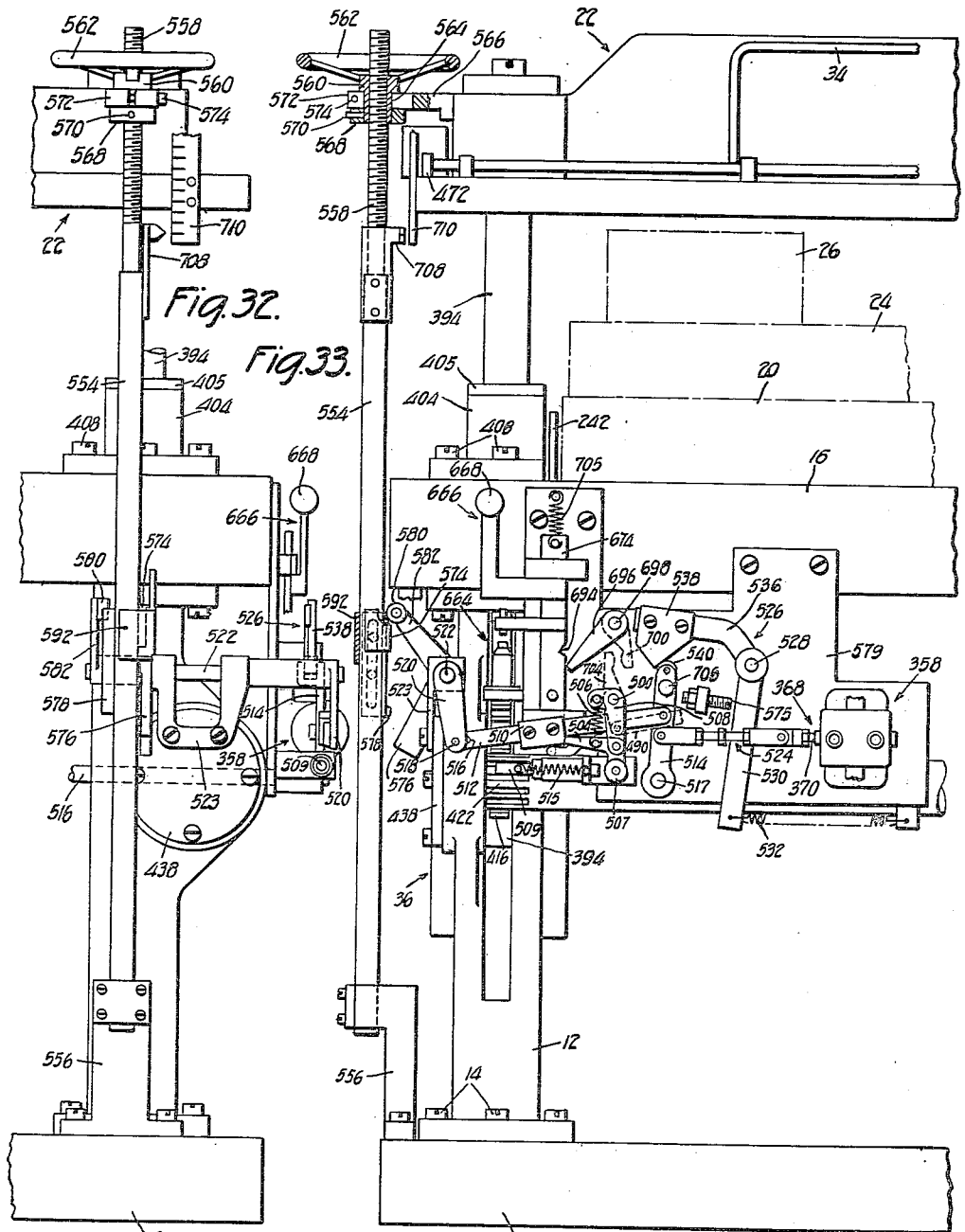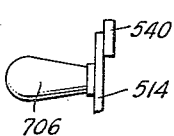
Fig. 32.
Fig. 33.
Fig. 33a.
INVENTOR.
Abraham Novick
BY
Moser, Nolte, Crews & Berry
ATTORNEYS INVENTOR.
Abraham Novick
BY
Moser, Nolte, Crews & Berry
ATTORNEYS INVENTOR.
Abraham Novick

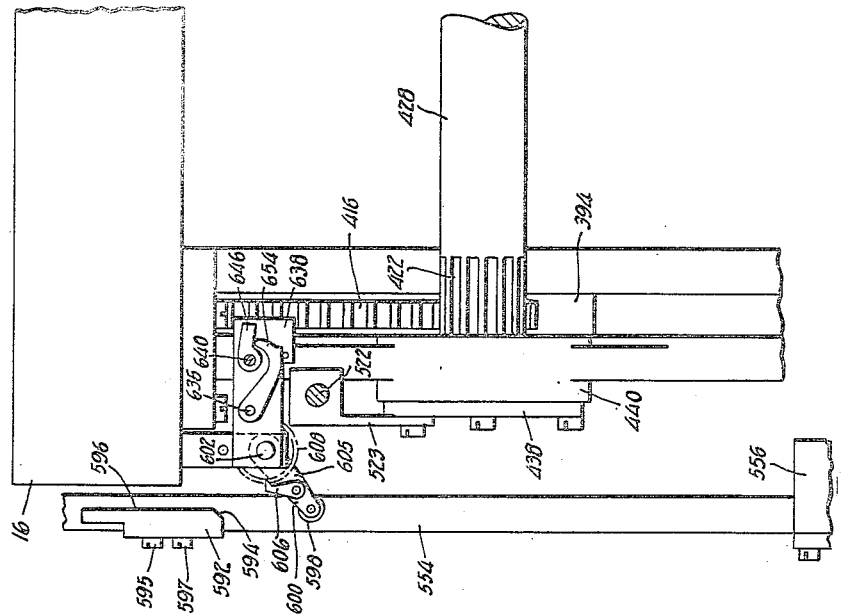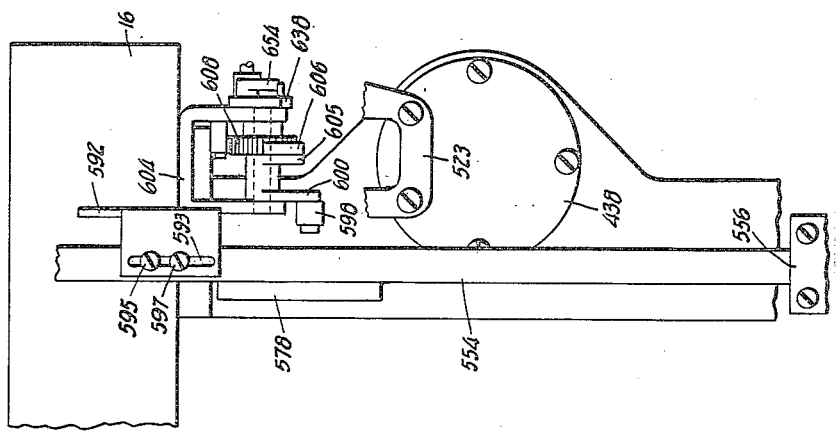

Oct. 15, 1957
A. NOVICK
2,809,695
DIE PRESSES
Filed Nov. 8, 1949
29 Sheets-Sheet 24
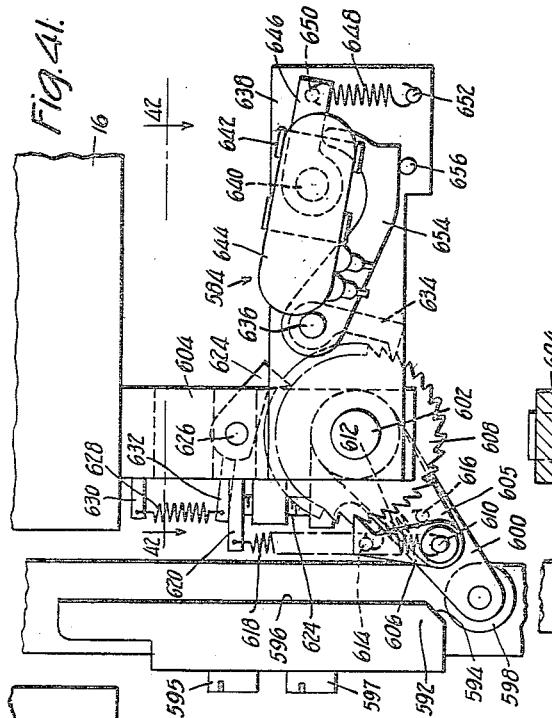
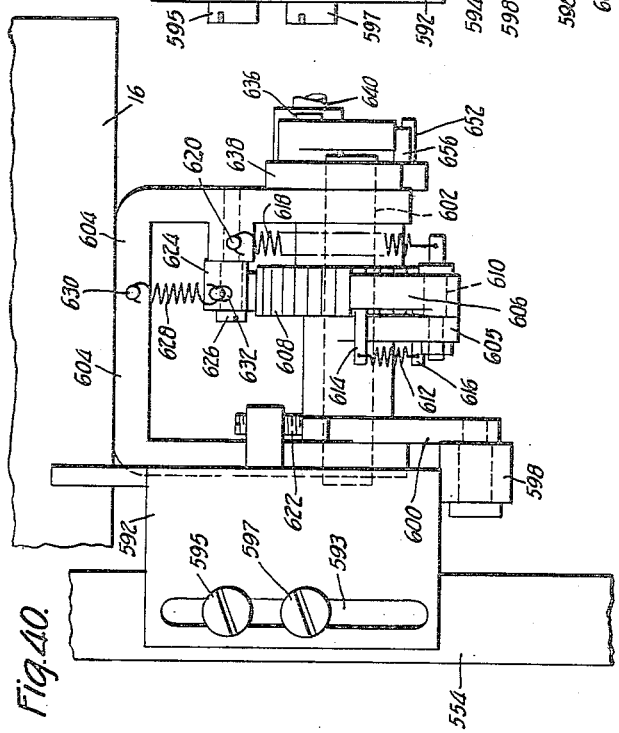
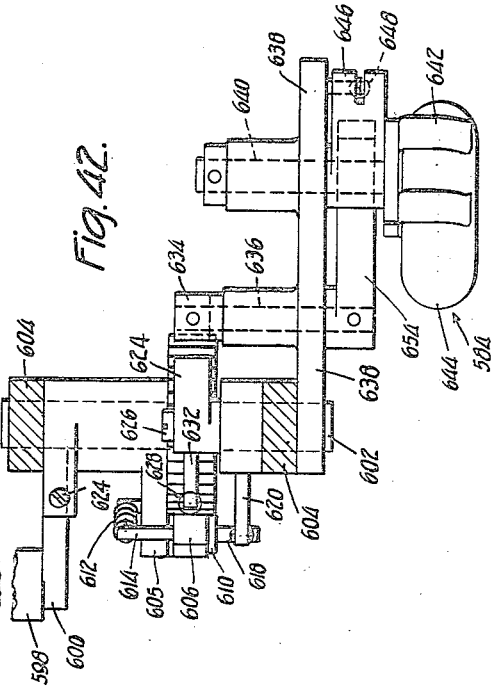
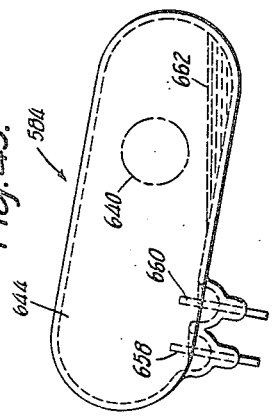
INVENTOR.
Abraham Novick
BY
Moses, Nolte, Crews & Berry
ATTORNEYS

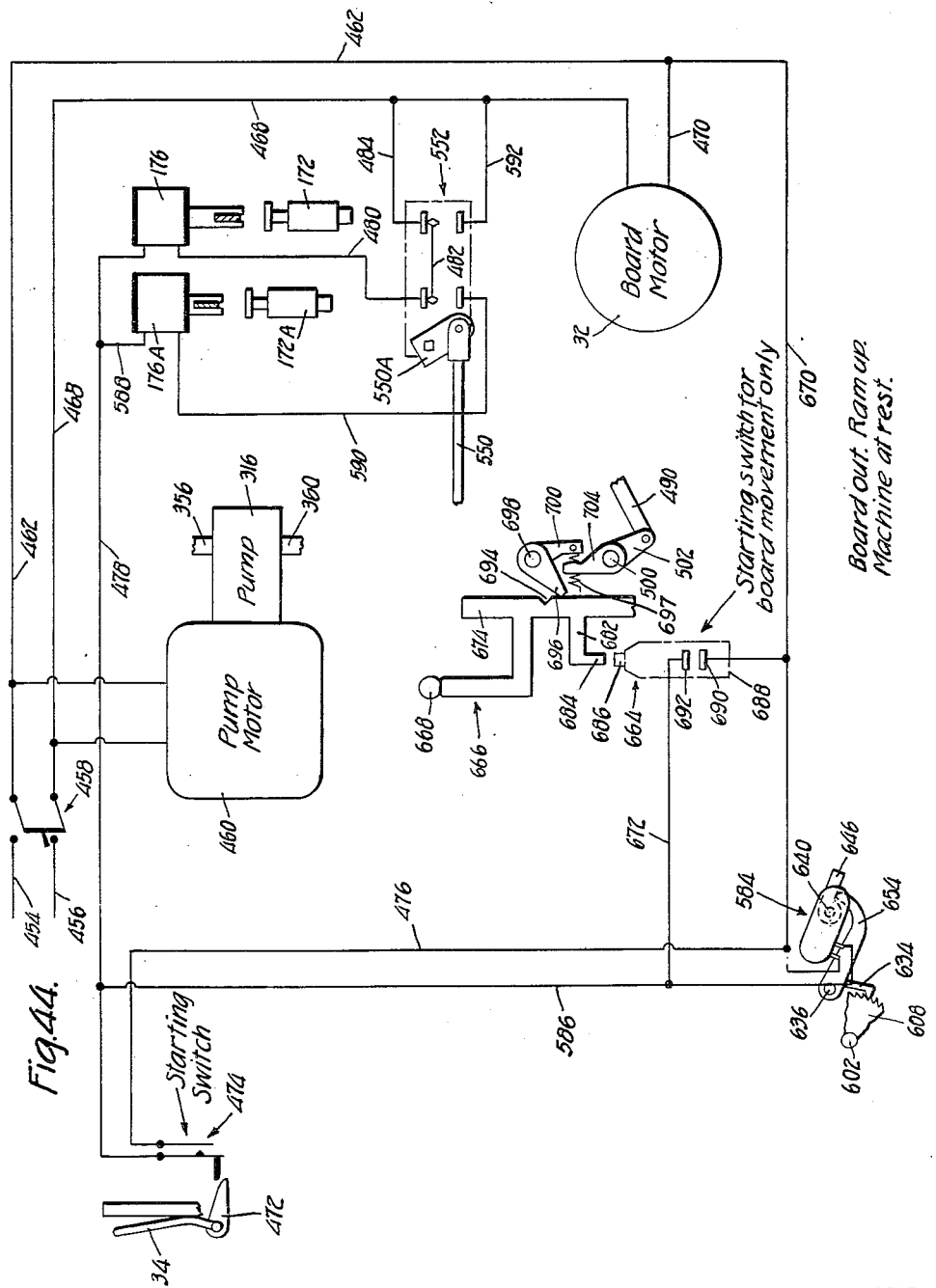

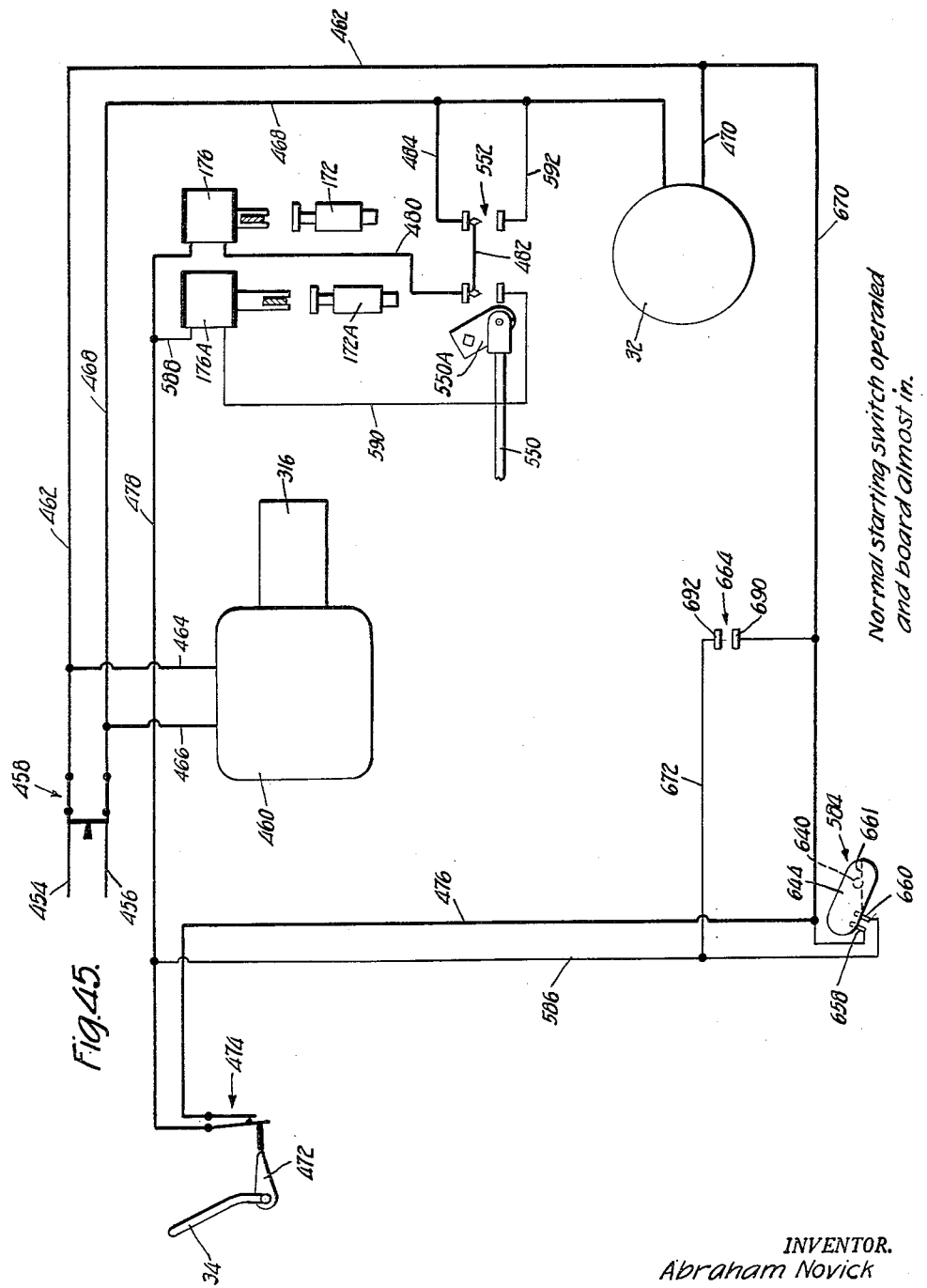

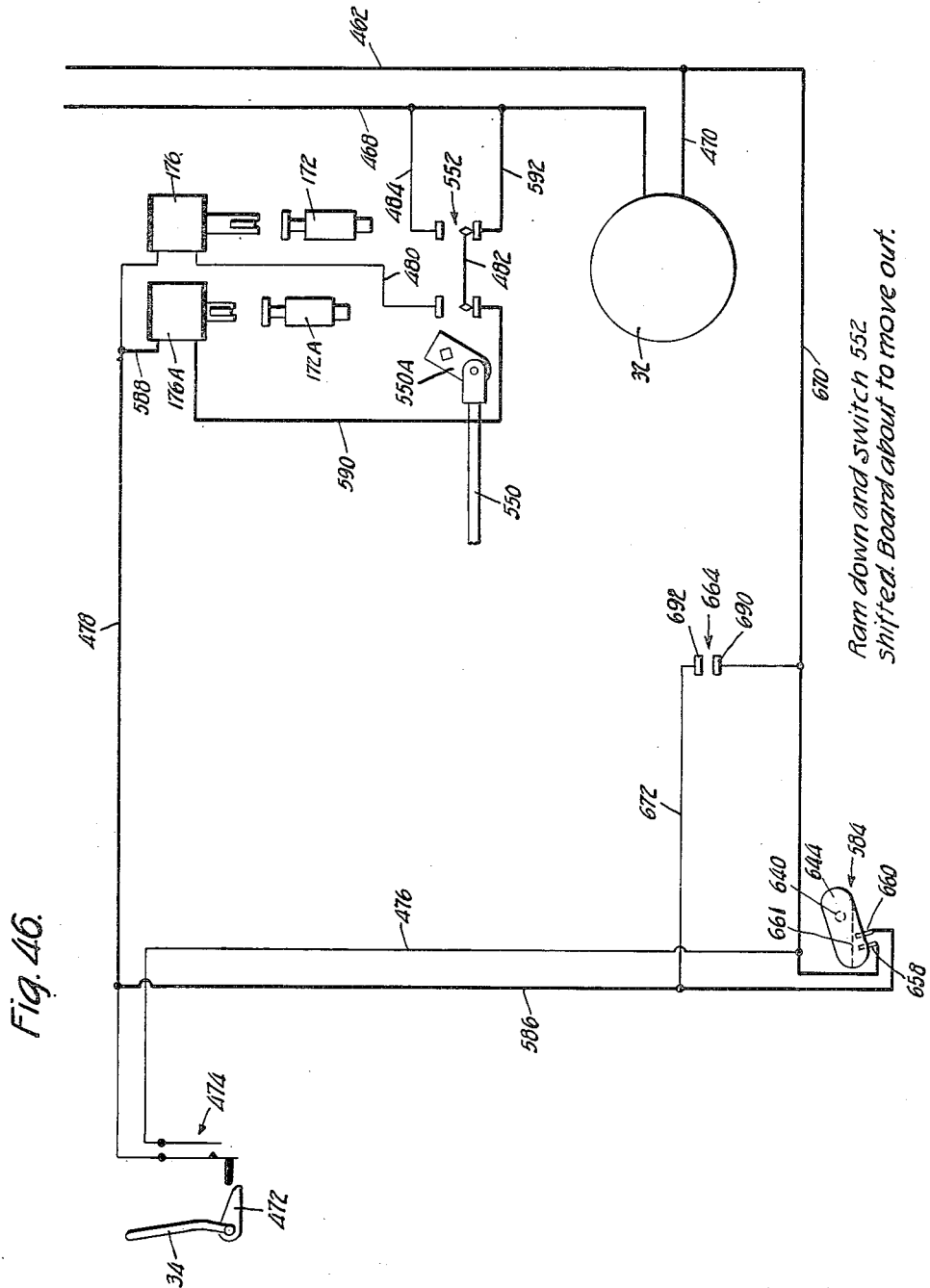

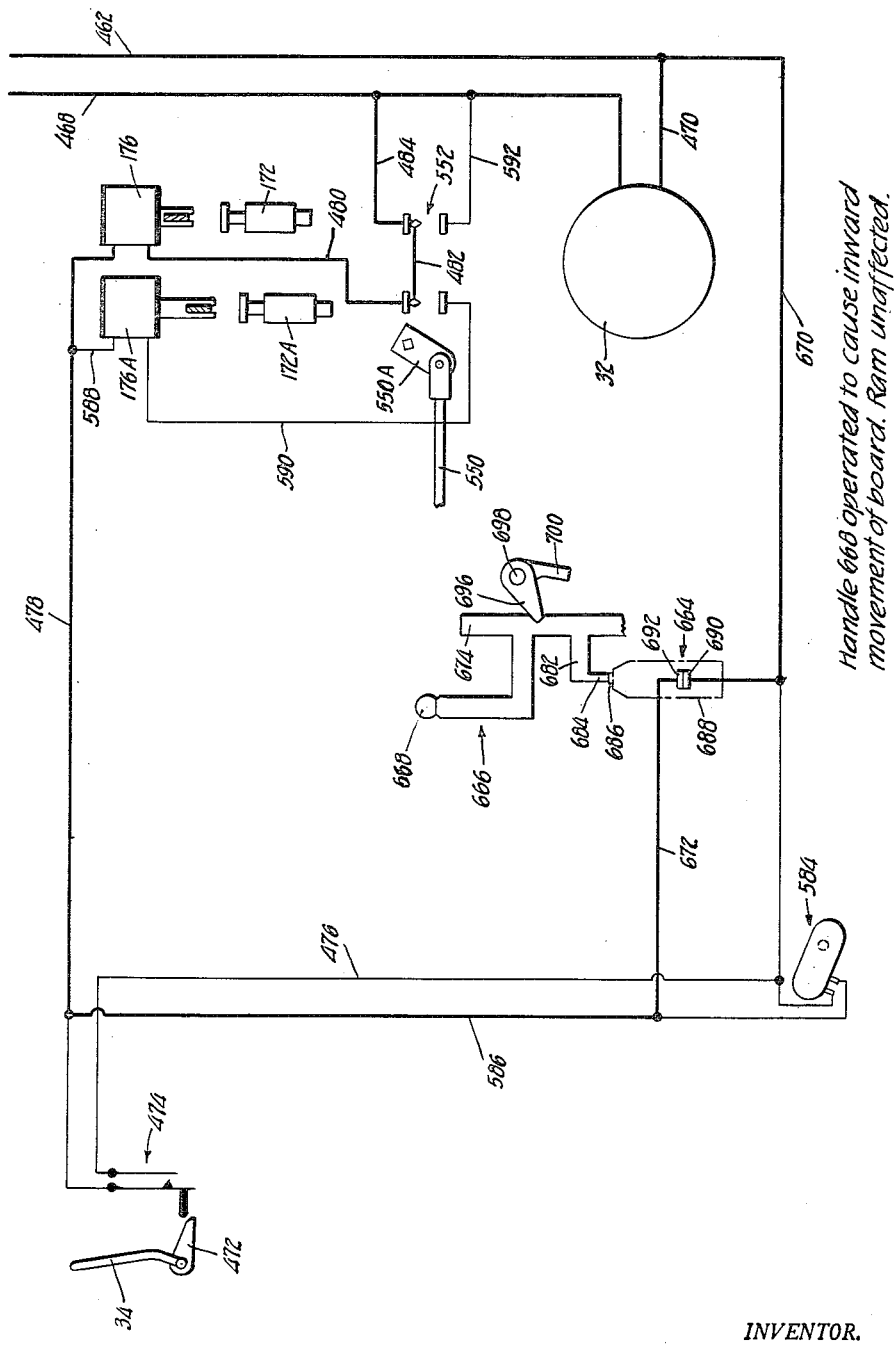

Oct. 15, 1957   A. NOVICK   2,809,695
DIE PRESSES
Filed Nov. 8, 1949   29 Sheets-Sheet 29

INVENTOR.
Abraham Novick
BY
Moses, Nolte, Crews + Berry
ATTORNEYS

United States Patent Office 2,809,695
Patented Oct. 15, 1957

2,809,695

DIE PRESSES

Abraham Novick, Flushing, N. Y., assignor to F. S. Smithe Machine Co., Inc., New York, N. Y., a corporation of New York Application November 8, 1949, Serial No. 126,187

31 Claims. (Cl. 164—21)

This invention relates to machines for die cutting paper, or other sheet material, arranged in stack form, by forcing a die through the stack.

In accordance with a common practice of the prior art, provision is made of a machine known as a die press which comprises a continuously reciprocating plunger head or ram driven from a shaft equipped with a heavy fly-wheel. The operator places the stack of sheet material upon a cutting board, places the die in a desired position upon the stack, and then, while the ram is in the upper range of its movement, manually thrusts the board with the supported stack and die under the ram so that the die will be driven through the stack by the head upon the next descent of the ram. The operator then manually withdraws the board with the supported stack and die from beneath the head, as the ram moves upward away from the stack and before the ram has had time to descend a second time. The operation is repeated after a short period, depending upon the time required by the operator to remove and dispose of the cut blanks, and to effect a fresh arrangement of the die on the stack.

This procedure of manually shifting the cutting board is laborious for the operator and requires skillful timing on his part. He must be careful to get the die under the ram at the right moment. He must also be careful to have the die fully under the ram, for the die is likely to be broken if it is only partly under. There is also another disadvantage to this operation, and that is the element of danger for the operator. He must be extremely careful that his fingers do not become caught under the cutting head as he pushes the board and stack into cutting position. It is common practice, moreover, when nothing but waste or scrap remains of a stack of sheets, to push the waste stack rearwardly out of the machine across the cutting table. In doing this the operator must be very careful to avoid injury to his hands by the ram.

As an improvement upon the structure referred to above, it has been proposed in United States Patent #2,259,320, granted jointly to Daniel Novick and myself on October 14, 1941, to provide a die press comprising fly-wheel mechanism for constantly operating a ram, in combination with mechanically operated cutting board actuating mechanism adapted to be rendered operative manually at the will of the operator, and arranged when so rendered operative to carry out a single cycle of cutter board operations in mechanically synchronized relation with the cycle of operations of the plunger head.

This arrangement, while an improvement upon its predecessors, involved the element of danger incident to the disposal of waste by pushing the waste across the table beneath the plunger head and out of the machine during reciprocation of the plunger head, and also had the disadvantage that maximum ram operating power must be delivered at all times, during idle as well as active strokes of the plunger.

None of the mechanisms referred to had any capacity for adjustment of extent of ram stroke.

The present invention is in the nature of an improvement upon the mechanisms referred to above.

In accordance with a salient feature of the invention, the continuous operation of the ram is obviated, the ram being operated only as required by the direct application of hydraulic power.

It is a further feature of the invention that power mechanism is provided for operating the cutting board at will as required, and for automatically operating the ram in coordination with the operation of the board.

It is a further feature that means are provided whereby power operations of the board and ram may be independently produced when desired.

It is another feature that provision is made for adjusting the upper and lower limits of ram movement in accordance with cutting board wear, and with the thickness of the work and die.

It is also a feature that hydraulic pressure regulating means is provided to enable pressures to be applied by the ram consistent with the varying requirements of the work. This enables power to be conserved on the low pressure jobs and enables the reversal of ram movement at the conclusion of cutting to be effected with great precision and without shock.

It is still another feature of the invention that the range of movement of the board operating means is made considerably less than the length of the board, and that provision is made for altering the connection between the board and its operating means to make one zone or another of the board active at the will of the operator. This enables the size of the board operating mechanism to be reduced, the speed and time of board operation to be reduced, and power to be saved. It also enables the fore and aft dimensions of the ram to be made smaller, thereby reducing the weight and power requirements.

It is a further feature that separate drives are provided at opposite extremities of the ram, and that equalizing mechanism is provided for compelling such extremities to operate in unison.

Other objects and advantages will hereinafter appear.

In the drawing forming part of this specification

Fig. 1 is a view in right side elevation, partly broken away, of a practical and advantageous form of die press embodying features of the invention with some parts omitted, but with all the illustrated parts shown in their normal positions;

Fig. 2 is a fragmentary detail sectional view taken upon the line 2—2 of Fig. 1 looking in the direction of the arrows;

Fig. 3 is a fragmentary detail sectional view upon a larger scale than Fig. 1, the section being taken upon the section line 3—3 of Fig. 1 looking in the direction of the arrows;

Fig. 4 is a left side elevation of the machine illustrated in Fig. 1 with the cutting board and die shown operated to a position beneath the ram, some of the parts being omitted;

Fig. 5 is a view in sectional, front elevation taken upon the line 5—5 of Fig. 1 looking in the direction of the arrows, with some of the parts omitted;

Fig. 6 is a sectional view taken upon the line 6—6 of Fig. 5 looking in the direction of the arrows;

Fig. 7 is a sectional, plan view taken upon the line 7—7 of Fig. 1 looking in the direction of the arrows;

Fig. 8 is a view similar to Fig. 7, but showing the cutting board shifted relative to its actuating mechanism and the table;

Fig. 9 is a fragmentary view in front elevation showing principally the means for connecting the board with its actuating mechanism and for changing the position of the board relative to said mechanism;

Fig. 10 is a fragmentary sectional view taken upon the line 10—10 of Fig. 7 looking in the direction of the arrows;

Fig. 11 is a fragmentary sectional view taken upon the line 11—11 of Fig. 10 looking in the direction of the arrows;

Fig. 12 is a fragmentary sectional view taken upon the line 12—12 of Fig. 1 looking in the direction of the arrows, some of the parts being broken away for revealing underlying structure;

Fig. 13 is a fragmentary sectional view taken upon the line 13—13 of Fig. 14 looking in the direction of the arrows;

Fig. 14 is a fragmentary sectional view taken upon the line 14—14 of Fig. 12 looking in the direction of the arrows, the cutting board being shown as just arriving in cutting position;

Fig. 15 is a fragmentary sectional view taken upon the line 15—15 of Fig. 16 looking in the direction of the arrows;

Fig. 17 is a view generally similar to Fig. 16, but with some of the parts omitted and with the illustrated parts shown in a different operating phase;

Fig. 18 is a fragmentary detail sectional view of a portion of the mechanism illustrated in Figs. 16 and 17;

Fig. 19 is a fragmentary enlargement in sectional side elevation of a portion of the mechanism illustrated in Fig. 14;

Fig. 20 is a detail front view in vertical section, taken upon the line 20—20 of Fig. 19 looking in the direction of the arrows;

Fig. 21 is a fragmentary sectional plan view taken upon the line 21—21 of Fig. 19 looking in the direction of the arrows;

Fig. 22 is a fragmentary sectional plan view taken upon the line 22—22 of Fig. 19 looking in the direction of the arrows, the parts being shown at a point when the cutting board is just about to complete its in-stroke to the cutting position;

Fig. 23 is a view similar to Fig. 22, but showing the parts just as the cutting board has substantially completed its out stroke to the forward or non-cutting position;

Fig. 25 is a view in front sectional elevation taken upon the section line 12—12 of Fig. 1, looking in the direction of the arrows, and illustrating principally the ram operating hydraulic system, some parts being broken away and others being omitted;

Fig. 26 is a sectional plan view taken upon the line 26—26 of Fig. 25 looking in the direction of the arrows, with some of the parts broken away;

Fig. 27 is a perspective view of the hydraulic system as viewed from an upper, forward, right-hand point of observation;

Fig. 27A is a fragmentary diagrammatic view in elevation, partly in section, showing principally features of the portion of the hydraulic system that delivers oil to the valve chest;

Fig. 28 is a vertical fragmentary detail sectional side view taken upon the line 28—28 of Fig. 29 looking in the direction of the arrows, and illustrating a control valve associated with the ram operating cylinders;

Fig. 29 is a sectional front view taken upon the line 29—29 of Fig. 28 looking in the direction of the arrows, the parts being shown in positions occupied by them when the ram is at rest in its upper position;

Fig. 30 is a view similar to Fig. 29, but showing the valve set in the position for producing downward movement of the ram;

Fig. 31 is a view similar to Fig. 29, but showing the valve set for producing upward movement of the ram;

Fig. 32 is a fragmentary side elevation of the mechanism illustrated in Fig. 33 with some of the parts omitted;

Fig. 33 is a fragmentary view in front elevation and partly in section showing principally the valve operating mechanism;

Fig. 33a is a fragmentary detail view in elevation;

Fig. 38 is a fragmentary view in side elevation illustrating principally mechanism for operating a mercury switch, through which movement of the cutting board is in part controlled;

Fig. 39 is a fragmentary view in front elevation of the mechanism illustrated in Fig. 38;

Fig. 40 is a fragmentary view of a portion of the mechanism of Fig. 38 on a larger scale than Fig. 38;

Fig. 41 is a fragmentary view in front elevation of the mechanism shown in Fig. 40;

Fig. 42 is a fragmentary sectional plan view taken upon the line 42—42 of Fig. 41 looking in the direction of the arrows;

Fig. 43 is a detail view of the mercury switch per se; and

Figure 16:
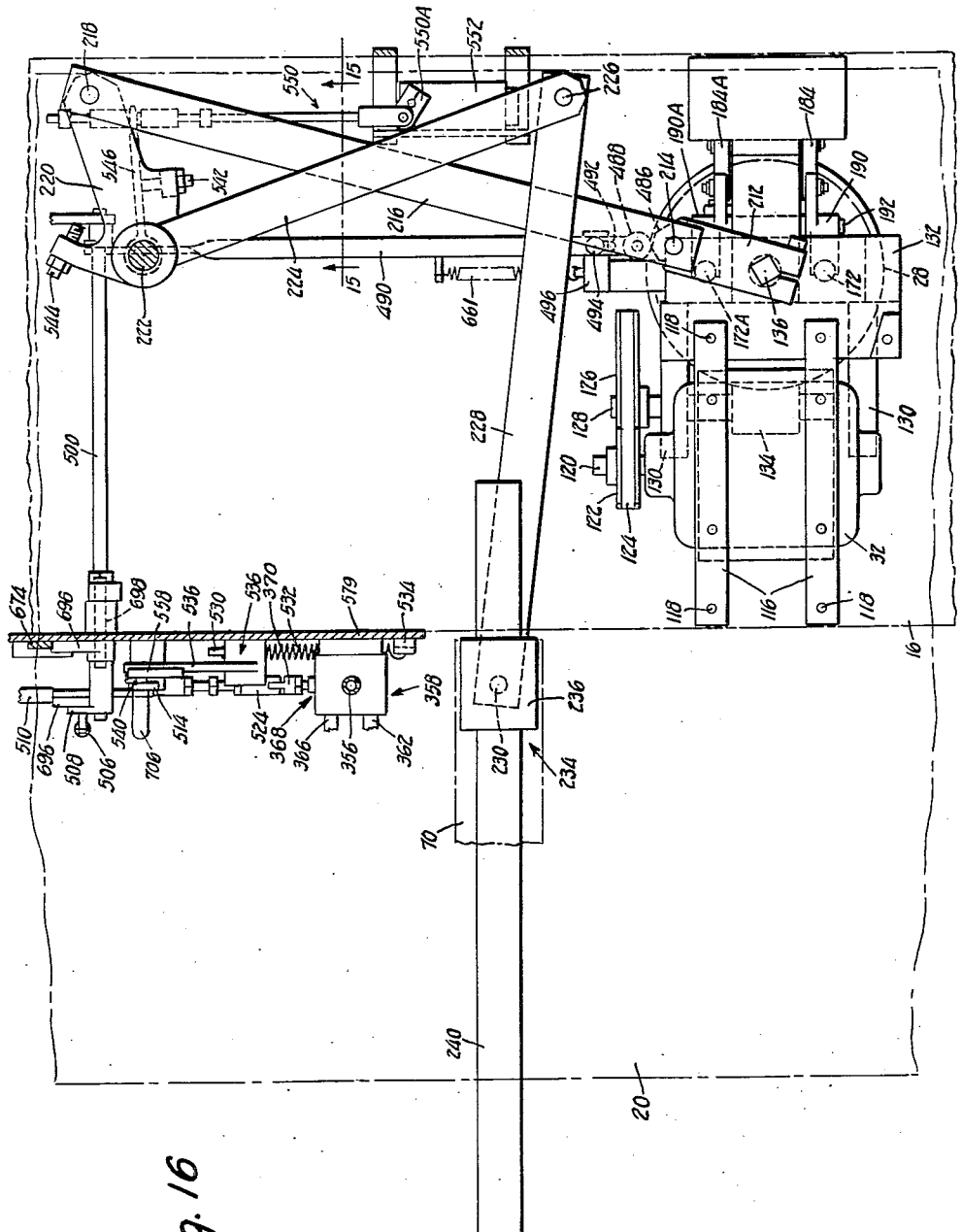
Fig. 16 is a fragmentary sectional plan view taken upon the line 16—16 of Fig. 14 looking in the direction of the arrows.
Figure 24:
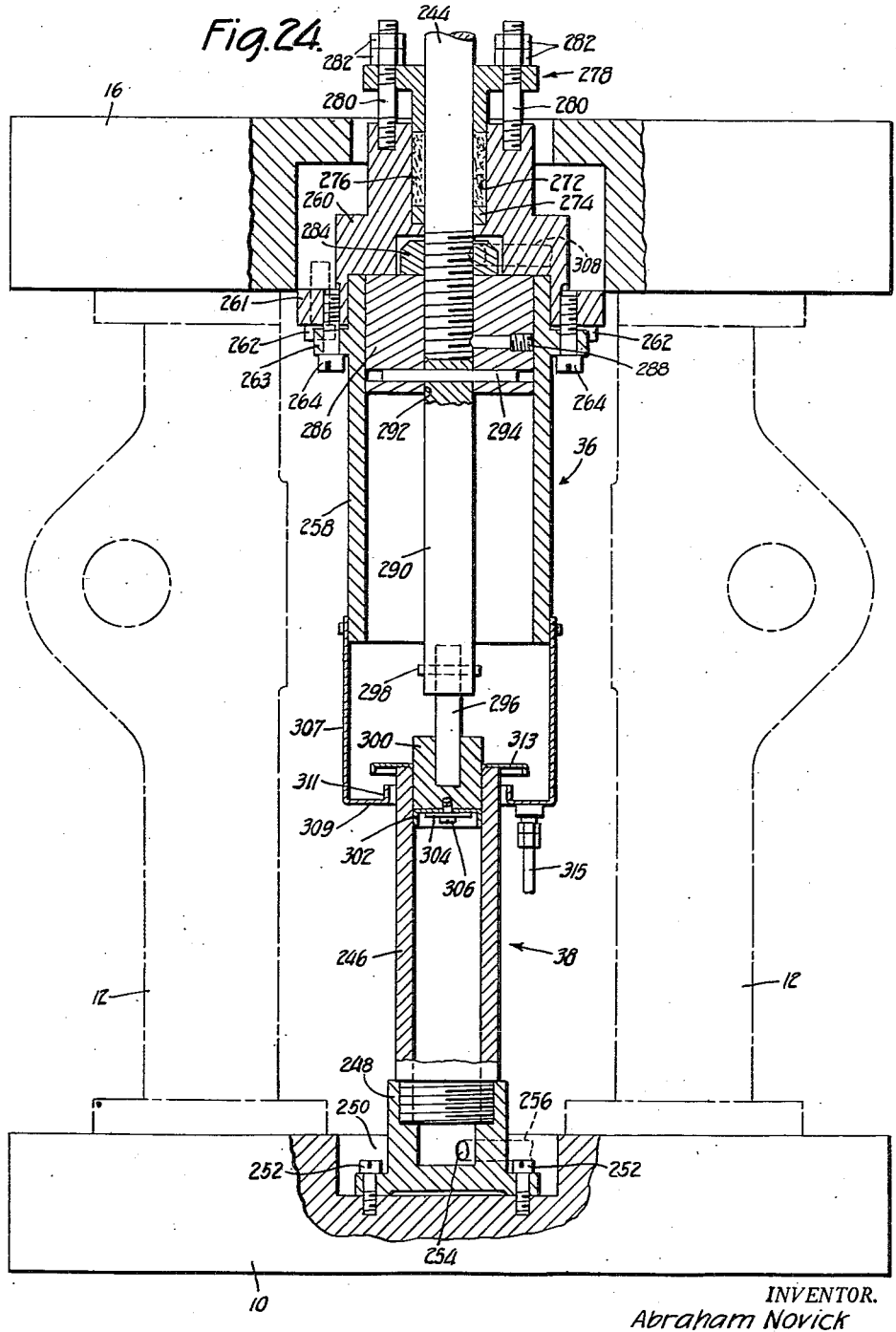
Fig. 24 is a view in elevation looking in from the left side of the machine and illustrating principally the piston and cylinder mechanism at the left side of the machine through which the ram is operated, parts of the structure being broken away to reveal underlying parts.

Figs. 44 to 48, inclusive, are electrical diagrams similar to one another and showing the operating and controlling circuits in various operative conditions.

The illustrative die press comprises a base 10. Hollow flanged legs 12 are secured at their lower ends to the base by screws 14. The table 16 is supported by the legs 12 in fixed position by screws 18 and constitutes a support for sustaining a slidable cutting board 20 against the pressure of a reciprocable ram 22 during the cutting operation.

Without regard to detail, the general principle of the normal operation of the illustrative mechanism will be briefly outlined at this point as an aid to the ensuing description.

The cutting board 20 normally occupies a retracted position as illustrated in Figs. 1 and 7 and carries upon it a stack 24 of paper sheets from which blanks are to be cut by means of a cutting die 26. All of the parts normally stand idle save that a worm gear 28 (Figs. 12 and 14) forming one element of a clutch 30 is constantly driven by a motor 32.

When the die 26 has been properly placed upon the stack 24 and it is desired to effect a dieing operation, a tripping switch handle 34 is pulled forward (toward the left in Fig. 1) by the operator (see Fig. 5 also). This energizes an electromagnet through which the clutch is rendered active for a half revolution, as in Figs. 14 and 16, causing the cutting board 20 to be moved inward or rearward for a distance equal substantially to one-half its length as in Fig. 4.

As an incident of the last portion of such inward movement a control valve 368 is shifted to cause oil under pressure to be admitted to upper cylinders 36 and 36A (Figs. 1, 5, 25 and 24) of a hydraulic system to drive the ram 22 downward. Such downward movement of the ram occurs with the cutting board 20 idle, and is effective to drive the die through the stack 24. It also serves, at the conclusion of such downward movement, to shift the hydraulic control valve and cause the oil under pressure to be admitted to lower cylinders 38 and discharged from the upper cylinders 36. This automatically reverses the direction of movement of the ram 22 and causes the ram to be returned to its normal raised position, as illustrated in Fig. 1.

Shortly after the ram starts upward it causes the cutting board operating clutch to be again tripped and to produce a second half revolution of the cutting board actuating mechanism, to the position in Fig. 17, whereby the cutting board is restored to its original or normal position as illustrated in Figs. 1 and 7. At the conclusion of the upward movement of the ram 22, the ram is brought automatically to rest, so that the parts are fully restored and ready for a second cycle of operations as soon as the operator has disposed of the cut blanks and relocated the die 26 for a fresh cut.

The cutting board 20 rests in its Fig. 1 position upon supporting bars 40 (Figs. 1, 5 and 7) which extend forwardly from the table 16 with their upper faces in the same horizontal plane as the upper face of the table. Each bar 40 is secured at its rear through a plate 42 to the front of the table 16. Each bar has a fixed ear 43 upon its forward end through which it is connected by means of a screw 46 to a diagonal rod 44. The lower end of the rod 44 is connected by a screw 48 to a lug or ear 50 of the base 10.

The cutting board 20 is made of hard wood and is surrounded by a metallic band 52, by which it is reinforced, and through which it is connected to operating mechanism. The band 52 has attached to it by bolt and nut connections 54 (Figs. 1, 7 and 9) a pair of slotted brackets 56 through which a vertically adjustable connection is established between the band and an angle bracket 58. The bracket 58 is engaged by a small drive connector 60, which comprises a recessed portion 62 in the form of a shallow inverted U, a plate 64 and screws 66 that connect the plate 64 to the block 62. The slot 68 formed between the block 62 and the plate 64 receives and fits upon an actuating slide bar or rod 70 which is adapted to be reciprocated fore and aft.

It is desirable that the stroke of the cutting board operating mechanism be short, since this enables the ram and the drive mechanism to be of compact construction, and saves time and operating energy in the operation of the machine. The illustrative drive mechanism is accordingly designed to effect a cutting board stroke equal substantially to one-half the length of the cutting board, while provision is made for connecting the carriage 60 to the actuating bar 70 in either of two selected positions so that under one condition the rear half of the cutting board is carried alternately beneath and clear of the ram 22 while under the other condition the forward half of the cutting board is carried alternately beneath and clear of the ram.

The mechanism for selectively effecting these connections between the actuating bar 70 and the cutting board 20 forms part of the connector 60 and is illustrated in Figs. 1, 4, 7 and 8, and particularly in Figs. 9, 10 and 11. The connector 60 has affixed to it two upstanding sleeves 72 and 74 which are formed with slots 76 at their upper ends. In the sleeves 72 and 74 slidable pins 78 and 80 are mounted. These pins are formed with reduced lower ends as illustrated at 82 in the case of the pin 78 (see Fig. 10). The pins 78 and 80 are transfixed, respectively, by horizontal pins 84 and 86.

The pins 84 and 86 project to the front and rear of the pins 78 and 80, and ride in the slots of the sleeves 72 and 74. The forward ends of the pins 84 and 86 are connected, respectively, by springs 88 and 90 to the carriage block 60, and tend to urge the pins 78 and 80 downward into engagement with the actuating bar 70. As the parts are shown in Figs. 1, 7, and 11, the lower end of pin 78 is projected to fit into a hole 92, this hole being provided near the outer end of the actuating bar 70 and at the left-hand side thereof, as best seen in Fig. 8.

When the parts are in the relative positions illustrated in Fig. 8, the pin 80 has its lower end projected to fit into a hole 94 of the actuating bar 70, this hole being provided near the inner end of the bar 70 at the right-hand side thereof, as best seen in Fig. 7. The holes 92 and 94 are spaced from one another by a distance equal substantially to the distance through which the cutting board 20 is moved at an operating stroke, this distance, as noted, being equal substantially to one-half the length of the cutting board or approximately one-half the length of the paper pack 24.

Provision is made of means for alternatively rendering the pins 78 and 80 effective. The rear ends of the pins 84 and 86 extend toward the axis of an upstanding headed post 96 (Fig. 10) which is affixed to the connector block 60. A lever 98 pivotally mounted upon the post 96 is provided with upstanding cam portions 100 and 102 (see Fig. 11 also), which form a notch between them. Each cam portion includes a horizontal face and a sloping face, the notch being formed between the sloping faces.

The lever 98 can be turned to align the notch with either of the pins 84, 86. In Fig. 10 the pin 84 is shown aligned with the notch, so that the pin 78 is free to move downward and have its lower end 82 projected into the hole 92 of the actuating bar 70. At this time the pin 86 rests upon the raised horizontal portion of the cam member 102, as in Fig. 11, to hold the pin 80 withdrawn from engagement with the actuating bar 70. This is also the Fig. 7 position of the parts.

When the lever 98 is swung from the position illustrated in Fig. 7 to that illustrated in Fig. 8, the notch is carried into alignment with the pin 86, and hence permits the pin 80 to be projected downward into engagement with the actuating bar 70. At the same time the cam 100 moves under the pin 84 and carries the pin upward onto the raised horizontal surface of the cam to cause the pin 78 to be withdrawn from engagement with the bar 70.

The mere operation of the lever 98 does not, however, establish the new connection between the carriage 60 and the actuating bar 70. It is necessary that the connector 60 and the cutting board 20 be moved inward relative to the actuating bar far enough to align the pin 80 with the hole 94. When this alignment occurs, the pin 80 automatically snaps downward into interfitting relation with the hole 94, so that the new connection is established.

For the purpose of rocking the lever 98 and of detaining it in a desired position, a rod 104 (Figs. 7, 8 and 9) is pivotally connected to the free end of the lever 98. The rod 104 extends through the angular end 106 of the bracket 58 and is formed with two notches 108 and 110. A spring 112 attached to the bracket member 106 urges the notched face of the rod 104 against a wall of the opening in the bracket member 106 through which the rod passes. The spring makes the notches 108 and 110 effective to hold the rod 104 against longitudinal movement. The notch 108 detains the rod in the Fig. 7 position, while the notch 110 detains the rod in the Fig. 8 position. The rod 104 is provided with a handle 114. When it is desired to operate the rod, the handle is seized and pulled forward against the force of the spring 112 to disengage the effective notch. The handle is then operated as desired and is detained in its new setting by the notch which was previously ineffective.

The mechanism for driving the actuating bar 70 comprises, as has been noted, a motor 32. Although the actuating bar 70 is normally idle, the motor runs constantly.

The motor 32 is carried by the lower side of the table 16 (Figs. 12, 14 and 16). Parallel motor supporting bars 116 are affixed to the lower side of the table, and the motor base is secured to the bars by means of screws 118. The motor output shaft 120 has fast upon it a pulley 122 which acts through a belt 124 to drive a pulley 126 fast upon a worm shaft 128. The worm shaft 128 is rotatably mounted in extensions 130 of a bracket 132, the bracket 132 being secured to the lower side of the table 16. The shaft 128 is supported on ball bearings 131 and 133 (Fig. 13) mounted in the extensions 130. The shaft 128 has fast upon it a worm 134 which drives the worm wheel 28.

The worm wheel 28 is rotatably mounted upon a vertical shaft 136, being supported from the shaft by means of a collar 138 through a thrust ball bearing 140. The shaft 136 itself, which has a collar 142 made fast upon it by means of a key 141 and a cross pin 143, is revolubly mounted in the bracket 132.

The worm wheel 28 drives the collar 142 and the shaft 136 through the remaining mechanism of the half revolution clutch 30 which will now be described (see Figs. 19, 21, 22 and 23). The worm wheel 28 is provided marginally with an upstanding annulus 144 in which a series of driver blocks 146 are set. Each driver block is secured in an angularly disposed slot 148 by means of a screw 150, and has an inner corner portion disposed to project inward beyond the inner cylindrical face 152 of the annulus 144. The blocks 146 are designed to cooperate with a transmission arm 154 which is pivotally carried by the collar 142 for transmitting rotation from the worm gear 28 to the collar 142 and the shaft 136.

The collar 142 has a groove 156 formed in its upper face into which a block 158 is fitted and secured. The block 158 carries a pivot pin 160 which extends downward along the axis of an open sided bearing bore which is formed in the collar 142. The arm 154 has a particylindrical inner end which fits in the bore with capacity for limited rocking movement. The inner end of the arm 154 is itself formed with a bore which receives the bearing pin 160.

A plunger pin 164 is slidingly mounted in a bore 166 of the collar 142 and is impelled outward by a spring 168 to bear against the transmission arm 154 and urge it in clockwise direction, as viewed in Figs. 21 to 23, about the axis of the pin 160. When such clockwise movement of the transmission arm 154 is not obstructed, the plunger moves the arm 154 clockwise until an outer rounded corner portion 170 of the arm bears against the inner cylindrical periphery 152 of the annulus 144. In this position the arm can be engaged by the inward projecting corner of the first drive block 146 to overtake it. When so engaged it serves to transmit rotary motion from the worm gear 28 to the shaft 136 (as in Fig. 22).

In the normal or at rest condition of the parts, however, rotation of the transmission arm 154 and of the collar 142 and the shaft 136 is obstructed and prevented by a pin 172 (see Fig. 23) mounted to slide vertically in the bracket 132. As the parts are illustrated in Fig. 23, the pin 172 stands in obstructing relation to the arm 154 and is just about to arrest rotation of the shaft 136 with the actuating bar 70 at its forward or outer limit of movement. As the parts are seen in Fig. 23 the arm 154 has been arrested by the pin 172, but the collar 142 has not yet come to rest. During the slight continued turning of the collar 142, the arm 154 will be caused to rock about the axis of the pin 160 and swing clear of the drive block 146 with which it is shown engaged. This breaks the driving connection between the worm gear 28 and the shaft 136, causing the actuating bar 70 and the cutter board 20 to come to rest in the position shown in Figs. 1, 7 and 17.

The parts will remain at rest so long as the pin 172 remains down in a position to obstruct the arm 154. There is a pin 172A located diametrically opposite to the pin 172, correspondingly mounted and correspondingly operated. Mechanism is provided whereby the pin 172A is forced down into a position to obstruct the arm 154 as an incident of the raising of the pin 172 to non-obstructing position, and the pin 172 is forced down to an obstructing position as an incident of the raising of the pin 172A to a non-obstructing position. When the pin 172 is raised out of the way of the arm 154, therefore, the arm 154 is picked up by one of the blocks 146 and driven through one-half a revolution, the drive connection being interrupted by engagement of the arm 154 with the pin 172A, as shown in Fig. 21, in a manner already described for the pin 172. The described operation carries the cutting board from its forward or outer position to its rearward or inner position (Figs. 12, 14 and 16).

The subsequent withdrawal of the pin 172A from obstructing position causes another half revolution of the shaft 136 to be effected for restoring the cutting board to its outer or forward position.

The mechanism for operating the pins 172 and 172A comprises a pair of electromagnets 176 and 176A (Figs. 19 and 21) which are mounted upon the bracket 132. The armature 180 of the electromagnet 176 is pivotally connected through a pin 182 with one end of a rocking lever 184. The rocking lever 184 is rockably mounted upon a pivot pin 186, which is supported in the bracket 132. The end of the lever 184 remote from the armature 180 is connected through a link 188 with a second rocking lever 190 which lever is rockably supported upon a pivot pin 192, the pin being secured to the bracket 132 by a nut 194. The free end of the rocking lever 190 is bifurcated and has the ends of its arms engaged in a circumferential groove 196 formed in the pin 172 near the upper end thereof. It will be evident that the drawing upward of the armature 180 of the electromagnet 176 produces an upward or withdrawing movement of the pin 172.

The pin 172A is operated from the armature 180A of electromagnet 176A by precisely similar means and in precisely the same manner as has just been described for the means and mode of operating the pin 172 from the armature 180. Corresponding reference characters have, therefore, been applied to corresponding parts with the subscript "A" added in each instance, and no detailed description of the parts will be given.

In order to compel the pin 172A to move down as the pin 172 moves up, and vice versa, a rocking lever 198 is pivotally mounted upon a pin 200 to extend beneath the link connected ends of the levers 184 and 184A, as seen in Fig. 20. It will be apparent from an examination of Fig. 20 that as the link connected end of lever 184 is forced downward in response to an upward pull of electromagnet 176 upon the free end of the lever, the link connected end of lever 184A is simultaneously forced upward. In response to an upward pull by electromagnet 176A, the lever 198 is rocked counterclockwise by the lever 184A and forces the link connected end of lever 184 upward.

The lever 198 is provided at the center of its lower face with a downwardly extending pointed cam projection 202. An arm 204 pivotally supported by a pin 206 carries a roller 208 for cooperating with the cam projection. A spring 210 connected to the arm 204 presses the roller 208 forcibly against the cam projection 202 at all times. This construction is effective to assist completion of a movement of the lever 198 in either direction to its limit of movement in that direction, and to cause the lever 198 to maintain the associated depressed pin at its limit of downward movement.

The shaft 136 has affixed to its upper square end a crank 212 (Figs. 12, 14, 16 and 17) which is rotatively connected, through a pin 214 near its outer end, to a link 216. The link 216 is pivotally connected through a pin 218 with one arm of a bell crank lever 220 which is pivoted upon a vertical shaft 222 secured to the bottom of the table 16. The bell crank 220 also includes an arm 224 which is pivotally connected through a pin 226 to a link 228. The link 228 is pivotally connected to a post 230 (Fig. 1) which extends downward from a lower plate 232 that forms part of a slide 234. The slide 234 also includes an inverted U-shaped block 236 to which the plate 232 is connected by screws 238. The slide travels upon a square guide rod 240 which is secured to and extends forward from the table to guide the slide 234 in the direction of movement of the cutting board. The actuating bar 70 is secured at its inner or rear end to the upper face of the block 236. The cutting board is advanced across the table by movement transmitted from the slide 234 through the actuating bar 70. The cutting board travels between side guides 242 (Figs. 1, 5 and 7) which are secured to the top of the table 16 and extend parallel to the square guide rod 240.

The ram 22 is directly actuated by hydraulic mechanisms which are duplicates of one another, these mechanisms being disposed at opposite sides of the machine and being connected to the ram through supporting and operating piston rods 244. Since the mechanisms are duplicates, only the one at the right-hand side of the machine will be described in detail, and corresponding reference characters with the subscript "A" added in each instance will be applied to corresponding parts of the left-hand mechanism.

The lower cylinder 38 (Fig. 24) comprises a sleeve member 246 which is threaded at its lower end into a flanged cap 248. The flange of the cap 248 rests in a recess 250 of the base 10 and is secured to the base by screws 252. The lower end of the cap 248 is provided with a side passage 254 through which the cylinder 38 communicates with a conduit 256.

The upper cylinder 36 comprises a comparatively large flanged sleeve member 258 (Fig. 24) and a flanged head or cap member 260, see Fig. 26 also. The flange 261 of the head member 260 is rectangular and secured to the under side of the table 16 by screws 262, while the flange 263 of the sleeve 258 is circular and is secured to the flange of the head member 260 by means of screws 264.

The piston rod 244 has the upper end thereof (Fig. 1) passed through a bore of the ram 22. Above the ram, the rod 244 is threaded into a flanged sleeve 266 which is secured to the rod 244 by a cross pin 268 to prevent turning of the rod in said flanged sleeve. The sleeve 266 is made fast to the ram 22 by means of screws 270 which are passed through the flange of the sleeve and threaded into the ram.

The lower end of the rod 244 passes downward through the head 260 (Fig. 24) of the cylinder 36 to the interior of the cylinder. The upper portion of the head 260 is formed with a cylindrical recess 272 which contains a washer 274 and a quantity of packing 276. The rod 244 is surrounded by the washer and the packing and also by a packing gland in the form of a flanged sleeve 278. The sleeve portion of the gland 278 fits in the recess 272 and slidingly fits upon the rod 244. The gland is drawn toward the head 260 by means of threaded rods 280 that extend upward from the head 260, and a pair of nuts 282 on each rod above the flange of the gland 278, one of which is provided to apply clamping pressure and the other to lock the first in place.

The lower end of the rod 244 is threaded through a nut 284 and into a comparatively large upper piston head 286. When the desired adjustment of the piston head 286 relative to the rod 244 is obtained, the parts are locked in adjusted position by tightening of the nut 284 against the upper face of the piston head and by turning into binding engagement with the threaded end of the rod 244, a set screw 288 that is screwed into the piston head 286 from one side thereof, also serves to lock the piston 286 in place.

A further rod 290 extends upward into the bore 292 of the piston head 286. The rod 290 fits loosely upon a cross pin 294 which is carried by the piston head 286. The purpose of the loose fit is to obviate the need for exact alignment of the upper and lower cylinders. The rod 290 extends downward beyond the lower end of the cylinder sleeve 258. A smaller connecting rod 296 extends loosely into a socket at the lower end of the rod 290 and fits loosely upon a cross pin 298 carried by the rod 290. The looseness of the parts is again provided for the purpose of providing a limited amount of flexibility between the parts and for avoiding fine tolerances. The lower rod 296 has its lower end made fast in a relatively small piston head 300 which plays in the lower cylinder sleeve 246. The lower face of the cylinder head 300 has clamped to it a flexible cup washer 302 which is held to the piston head by means of a rigid washer 304 and a headed screw 306.

In order to prevent seepage of oil onto machine parts while admitting air to the open ends of the cylinders, a guard sleeve 307 is attached to the lower end of cylinder sleeve 258 and extends down around the upper end of cylinder sleeve 246. An annular bottom sheet 309 forms part of the sleeve 307 and has a ring 311. The ring 311 surrounds cylinder sleeve 246 but is spaced from it to provide a breather opening. A shield plate 313 mounted on the upper end of cylinder sleeve 246 extends outward beyond the ring 311 to cover the breather opening. An oil drain 315 is provided through the bottom sheet 309 and runs to an oil reservoir 312.

The oil admitted under pressure to the upper end of the upper cylinder 36, through conduit 308, acts against the upper piston head 286 to drive the rod 244 downward and thereby to drive the ram 22 downward with great force. The lower cylinder 38 is connected to exhaust its oil into a reservoir through the passage 254 and the conduit 256, the oil being forced out of the lower cylinder ahead of the lower piston head 300. At the conclusion of the down stroke the connections are reversed, the conduit 256 being placed in communication with the liquid under pressure and the passages 308, 360 being adapted to exhaust the liquid from the upper cylinder into the collecting reservoir 312.

The hydraulic mechanism through which the ram is raised and lowered is best illustrated in Figs. 25, 26, 27, 27a and 28. Oil from the reservoir 312 is drawn upward through an intake pipe 314 to a pump 316 and is discharged under pressure by the pump through a discharge pipe 318. The oil under pressure passes to an unloading valve 320.

The valve casing comprises a sleeve member 321 and end member 322 and 323, in the latter of which a plug 324 is threaded. A slide valve 325 in the casing consists of two heads 326 and 327 and a connecting stem 328. The slide valve 325 is urged toward the left by a spring 328a which bears against the right-hand end of the valve 320 and against the plug 324.

The oil always enters the valve casing between the valve heads 326 and 327 and may at times be returned to the reservoir 312 through a conduit 329, depending upon the position of the valve. The space between the valve heads is at all times in communication through a conduit 332 and a check valve 333 with a conduit 334. When the entrance to the conduit 329 is closed by the valve head 327, the oil coming from the conduit 318 is necessarily forced through the conduit 332 and the check valve 333 into the conduit 334. When the entrance to the conduit 329 is uncovered, however, the oil coming from the conduit 318 is all returned through the conduit 329 because it encounters no resistance in that path, whereas it must be forced into the conduit 334 against very substantial pressure. A seepage drain 329a is provided from the end of the sleeve 321, in which the spring 328a is housed, to the waste conduit 329.

The valve 325 is provided at its left-hand end with a stem 329b, which has a close sliding fit in a bore 329c of the end member 322. The position of the valve 325 is controlled by the pressure of oil admitted to the bore 329c through a passage 330 formed in the end member 322.

The conduit 334 runs in opposite directions from its point of junction with the conduit 332. One end of the conduit 334 runs to and communicates with an accumulator tank 336, in which a flexible nitrogen filled bag 337, desirably of "neoprene," is enclosed. The bag 337 is provided with an inflating, valved stem 339 which is mounted in one end of the tank wall and extends to the exterior thereof. The bag is desirably inflated to an initial pressure of the order of approximately thirty atmospheres, and at that pressure it fills the tank 336.

The other end of the conduit 334 runs to a pressure regulator 338. A pressure gauge 350 connected to the conduit 334 shows the pressure existing in the conduit, and helps to guide the operator in adjusting the regulating handle 352 of the pressure regulator.

The regulator 338 comprises a sleeve 339 and end members 340 and 341. The conduit 334 communicates with the interior of the regulator through a passage 342 formed in the end member 341. A slide valve 343 within the sleeve 339 is urged rightward toward the end member 341 by a spring 344. The spring 344 bears at one end against the valve 343 and at the other against a disk 345. The disk is carried by the inner end of a regulating adjusting screw 346, the head 352 of which has been referred to as the regulator handle. The screw 346 is threaded through the end member 340.

An angular passage 347 formed in the right-hand end of the valve is adapted to place the right-hand end of the sleeve 339 in communication with a conduit 348 that runs to the passage 330 of the unloading valve 320, by which oil is conducted to the bore 329c.

As shown in Fig. 27A, the valve 343 is at its right-hand limit of movement and the entrance port of the conduit 348 is closed off from communication with the conduit 334 by the valve. In this position of the parts, the entrance port of the conduit 348 registers with a circumferential groove 349 formed in the valve. This circumferential groove 349 at the same time registers with a drain passage 349a that runs to the chamber in which spring 344 is housed. This latter chamber communicates through a drain conduit 351 with the reservoir 312. In the condition of the parts illustrated in Fig. 27A, therefore, the left-hand end of bore 329c is in substantially free communication with the atmosphere, so that no pressure of any consequence is applied to the stem 329b of the unloading valve 325.

A pin 351a set in the sleeve 339 plays in a slot 351b of the valve 343 to maintain a proper orientation of the angular passage 347 with respect to the entrance port of the conduit 348.

The purpose of the hydraulic mechanism thus far described is to provide operating liquid under a definite and substantially uniform starting pressure for admission to the upper cylinders 36 and 36A, and to provide operating liquid for admission to the lower cylinders 38 and 38A. A conduit 356 connects the conduits 334 with a ram operating control valve chest 358. The chest 358 is also provided with a drain conduit 360, with a conduit 362 for supplying oil to, and receiving oil back from, the upper cylinders 36, 36A through a conduit 308, and with a conduit 366 for supplying oil to, and receiving oil back from, the lower cylinders through the conduit 256.

The slide valve 368, mounted for sliding movement in the chest 358, is operated and controlled by a connected rod 370.

The valve 368 consists of a cylindrical rod 372 having three enlargements or collars 374, 376 and 378 (Fig. 29) formed upon it, all of the same diameter. The valve chest is formed with a continuous bore 380 in which the collars 374, 376 and 378 slidingly fit.

The chest is formed with five circular grooves 382, 384, 385, 386 and 388 at intervals along the bore 380, the grooves 382 and 388 being constantly in communication with one another and with the discharge conduit 360 through a U-shaped passage 390. The lower cylinder conduit 366 communicates with the groove 386, while the upper cylinder conduit 362 communicates with the groove 384. The pressure supply conduit 356 communicates with the groove 385.

When the parts are in the neutral or idle position illustrated in Fig. 29, communication of the pressure conduit 356 with the bore 380 is cut off by the collar 376, while communication of the conduit 360 with the bore 380 is cut off at the opposite ends through the collars 374 and 378.

When the valve 368 is moved toward the left, however, as shown in Fig. 30, the pressure supply conduit 356 is placed in communication with the upper cylinders 36 and 36a through the groove 384 and the conduits 362 and 308, while the discharge conduit 360 is placed in communication with the lower cylinders through the U-shaped groove 390, the bore 380, groove 386 and conduits 366 and 256. With the valve in this condition, oil entering the upper cylinder drives the ram downward and causes the oil in the lower cylinder to be discharged.

Near the end of the downward stroke of the ram the valve 368 is shifted to the right-hand position illustrated in Fig. 31 (by mechanism which will be subsequently described and explained) to reverse the connection. The pressure supply conduit 356 is now connected through bore 380 and groove 386 to supply liquid through the conduits 366 and 256 to the lower cylinders while the discharge conduit 360 is connected through the passage 390, grooves 382 and 384 and bore 380 to discharge liquid from the upper cylinders through the conduits 308 and 362.

Now that the construction of the hydraulic system has been completely described, the principle of operation of the system can be more fully explained. In making this explanation, reference will be had primarily to the diagrammatic showing of Fig. 27A.

The pump 316 is capable of delivering the oil under considerable pressure, but only at a rate to effect maximum displacement of the two upper pistons and the two lower pistons about three times a minute. Since a single complete, maximum stroke operating cycle of the ram may be effected in a time interval of the order of one second, and such a cycle requires an expenditure of oil under pressure corresponding to the complete displacement of the two upper pistons and the lower pistons, it is evident that oil furnished by the pump must be accumulated over a considerable period and then expended at a rate faster than the pump alone would be able to supply it. It is primarily for this reason that the accumulator is provided.

With the parts in the condition illustrated in Fig. 27A, it may be assumed that a ram operating cycle has been concluded, and that the pressure in the conduit 334 has not yet been built up sufficiently to force the passage 347 over into communication with the conduit 348. In that condition of the parts there is no oil pressure in the bore 329c to force the valve 325 toward the right. Communication of the unloading valve chamber lying between the valve heads 326 and 327 with the waste conduit 329 is, therefore, completely cut off by the valve head 327 and all the oil delivered by the pump is forced out through the conduit 332, past the check valve 333, and into the conduit 334.

If the accumulator 336 with its pneumatic bag 337 were not provided, the pressure would increase very rapidly in the conduit 334 under these conditions. Since the nitrogen in the bag 337 obeys Boyle's law, however, the pressure in the conduit 334 varies inversely with the volume of the bag 337 and rises gradually as oil is forced into the accumulator tank 336 to compress the bag.

After a time, however, with the valve 325 maintained in the condition illustrated in Fig. 27A, the pressure in the conduit 334 will rise sufficiently to shift the valve 343, of the pressure regulator 338, leftward against the adjusted resistance of the spring 344, carrying the groove 349 out of communication with the conduit 348 and the passage 349a, and placing the conduit 334 through the passage 347 in communication with the conduit 348.

The oil pressure existing in the conduit 334 will under these conditions be transmitted through 348 and 330 to the bore 329c. This immediately shifts the valve 325 to the right, carrying the valve head 327 into engagement with a stop or stem 324a which is provided upon the plug 324. This causes the valve head 327 to completely uncover the entrance port of waste conduit 329, but does not permit the head 326 to obstruct the supply port from the conduit 318 nor the discharge port to the conduit 332. The head 326 serves only to balance the valve 325 with respect to the oil supplied from the conduit 318 so that the valve may be neutral with respect to that pressure and will respond uniformly at all times to pressure of the spring 328a and to oil pressure applied in the bore 329c.

When the condition just described has been attained, all the oil delivered by the pump will be returned through the waste conduit 329 to the reservoir 312, and the pressure in the conduit 334 will not rise higher. The parts are now ready for a ram operating cycle.

As soon as the slide valve 368 is shifted to its left-hand position (Fig. 30), the oil under pressure begins to pour into the upper cylinders 36 and 36a at a rate much faster than the pump can supply it. The additional quantity of oil required over that which the pump is able currently to furnish is supplied from the accumulator. As the oil flows from the accumulator, the bag 337 expands and the pressure in the bag and in the conduit 334 falls. It is possible, however, to so set the regulator handle 352 that the minimum pressure supplied is adequate to carry the die completely through the stack of sheets for completing the down-stroke of the ram.

At the conclusion of the down-stroke of the ram the valve 368 is reversed (Fig. 31), as has been explained, and relatively little force and little oil is required to return the ram to its upper limit of movement. At the conclusion of the upward movement, the pressure in the accumulator may have fallen to two-thirds the maximum value indicated by the gauge 350 just before the ram operating cycle was initiated. While the operator extracts the die from the stack of sheets, removes the cut blanks from the die, and places the die in a new position on the stack preparatory to a new cutting cycle, the pressure in the accumulator is again built up to the maximum. The employment of the accumulator greatly reduces the power which must be supplied by the pump motor, since it avoids the necessity of providing a pump and pump motor capable of delivering oil at all times at a rate equal to the maximum rate of oil consumption.

It is important that the regulator handle 352 be set to provide a maximum pressure so high that there will still exsist at the conclusion of an uninterrupted down-stroke of the ram a sufficient pressure to force the die through the last sheet of the stack.

When the operator has finished a job calling for the use of a given weight and toughness of paper and of a given size of die, and switches over to a new job involving a different weight of paper and a different size of die, he is confronted with the necessity of adjusting the machine for these changed conditions.

Under these circumstances, he adjusts the handle 352 until a maximum pressure is indicated by the gauge 350, which he knows from experience ought to be somewhat less than that required for the new job. Having made the other necessary preliminary adjustments and tests, as referred to hereafter, he then initiates a ram operating cycle. Since the pressure was intentionally set low, it is expected that the ram will stall without having cut completely through the sheets.

When the stalling occurs, with the die part way through the stack, the operator could merely wait for the pressure to be built up again toward the maximum pressure for the existing setting of the regulator handle sufficiently to force the die the rest of the way through the stack. The fact that stalling occurs, however, indicates that the handle 352 ought to be readjusted in a direction to produce a higher starting pressure in order to secure a commercially practical speed of operation without stalling. The operator, therefore, immediately turns the handle 352 more or less in the direction to increase the pressure, and then waits for the cycle to be completed by the building up of pressure in the conduit 334 and the accumulator.

When the next cutting cycle is initiated, if the ram again stalls, the handle 352 is given a further turn and these adjusting operations are repeated at successive cycles until a satisfactory speed of uninterrupted operation is attained. No attempt is made to drive the ram downward at high velocity, nor is such a mode of operation desired, because the ram must change its direction of operation at the end of the down-stroke instantaneously and at a precisely determined point.

It is a very important feature of the present invention that the right and left hand sides of the ram are compelled to move in unison at all times, notwithstanding the unequal resistances encountered when the die is set to one side or the other of a central position. This balancing of the ram is also important from the standpoint of avoiding binding, distortion, and frictional resistance and wear of the parts.

The equalizing mechanism (Figs. 1, 2, 5 and 6) comprises front and rear equalizing units which are duplicates of one another, each of these units including right hand and left hand rack bars connected to move in unison respectively with the right and left hand extremities of the ram, and compelled to move in unison with one another through being gear connected to a common transverse shaft. Since the units are duplicates of one another only one of them will be described in detail, and corresponding reference characters will be applied to the corresponding parts of the other with the subscript "A" being added in each instance.

Right hand and left hand rods 392 and 394 are connected to the forward, right and left hand corners of the ram. Each rod extends through the ram and bears at its upper end against the lower face of a plate 396, which is secured against the upper face of the ram by screws 398. A large headed screw 400 is passed through the plate 396 and threaded into the upper end of the associated rod to clamp the lower face of the plate 396.

The rods 392 and 394 are alike in construction. They extend downward respectively through flanged sleeves 402 and 404 which are secured to the table 16 by screws 406 and 408. The sleeves 402 and 404 extend downward more than half way through the table 16, being fitted into bores 410 of the table. The sleeves 402 and 404 are in alinement respectively with the right hand and left hand hollow legs 12 upon which the table is supported.

Each of the sleeves 402 and 404, as shown in the case of the sleeve 402 of Fig. 3, is surmounted by a felt washer 403 and a flanged retaining ring 405, the ring being secured to the sleeve by countersunk screws 407. The washers wipe dust from the rods 392 and 394. The rings 405 serve as stops or rests to limit descent of the ram under its own weight when the machine is shut down overnight or for a longer period. The ram, when it has dropped down against the rings 405, is immediately and automatically returned to its upper limit of movement when the power is again turned on.

The rods 392 and 394 extend down into the hollow legs and have rack bars 414 and 416 secured upon them, the rack bars being set into grooves of the rods and secured in place as illustrated in the case of the rack bar 414 in Fig. 2 by screws 418. The teeth of the rack bars 414 and 416 run in mesh respectively with gear teeth 420 and 422 which are formed or provided upon the opposite ends of a composite shaft 424.

The shaft 424 consists of shaft sections 426 and 428 which are fixed to one another in alined relation by complementary half sleeve members 430, the sleeve members being drawn firmly toward one another to clamp the shaft sections by means of headed screws 432. The shaft ends run in ball bearings as illustrated in the case of the bearing 434 at the left hand end in Fig. 5. The ball bearings at the right and left hand sides are carried respectively in flanged cups 436 and 438 which are secured to enlarged portions 440 of the posts 12.

In order to assure correct meshing of the rack bars with the gear teeth of the shaft 424 a construction is provided which is illustrated in the case of the rod 392 in Fig. 2. As here shown, the rod 392 is made of smaller diameter than the bore of the hollow leg 12 in which it plays, while a guide or pressure block 442 is provided in a slot 444 of the post. The block 442 is made to fit the slot at its ends and sides. A backing plate 446 covers the slot, being clamped to the leg by screws 448. A pair of regulating screws 450 are threaded through the backing plate into proper engagement with the block 442, and may be adjusted to keep the rod 392 from moving away from the pinion 420 while the latter operates on the rack 414. The lock nuts 452 are provided upon the regulating screws 450.

With the front, right and left hand corners of the ram equalized and the rear right and left hand corners of the ram equalized, the ram is caused to maintain at all times a condition of parallelism with the upper face of the table and the upper face of the cutting board. There is no need to provide equalization between the front and rear edges because the piston rods are rigid with the ram and for several reasons the ram is of relatively small extent from front to rear. This limitation of the front to rear dimension is made possible by the fact that the mechanism is organized to bring all portions of the sheet stack into operative relation to the ram by means of an operating stroke equal only to half the length of the stack.

The mechanism for controlling and coordinating operations of the cutting board 20 and the ram 22 will be described principally by reference to the electrical diagrams of Figs. 44 to 48 and to Figs. 1, 4, 5, 12, 16, 17 and 32 to 41.

In Figs. 44 to 48 the electrical parts illustrated are substantially the same throughout, but the operating conditions shown differ from one another in the several views.

In Fig. 44 a shut-down condition of the machine is illustrated. In all of these views the convention has been followed of drawing in heavy lines the conductors through which current is flowing and of drawing in light lines the conductors which are, under the illustrated conditions, unenergized. Here line conductors 454 and 456 are open circuited by reason of the fact that a master switch 458 is in the open position. This is the condition which would prevail overnight or at any other time when the die press is not to be used for a considerable period. In the condition of Fig. 44 the motor 460 which is connected to drive the pump 316 is idle and the cutting board operating motor 32 is idle.

In Fig. 45 the switch 458 is shown swung to its closed position. This closes a circuit which may be traced out from line conductor 454 through one arm of the switch 458, conductors 462 and 464, the motor 460, conductors 466 and 468 and the second arm of switch 458 back to line conductor 456. The closing of the switch 458, therefore, energizes the motor 460 of pump 316, causing the pump to be driven throughout the working day or as long as the master switch remains in its closed position.

The closing of the switch 458 also completes a circuit through cutting board actuating motor 32 which may be traced out from line conductor 454 through an arm of switch 458, conductors 462 and 470, motor 32, conductor 468 and the second arm of switch 458 back to line conductor 456. This causes the motor 32 to be operated.

The closing of switch 458 also renders operative the other circuits which will be described making them subject to the controls to be described.

When the switch 458 is closed and the operator has placed the die 26 upon a stack of sheets in a desired position, the main starter switch handle 34 is swung forward by the operator and then immediately released. The handle 34 is pivotally mounted and has fast with it a cam 472 through which the movable member of the main starter switch 474 is swung to closed position. As soon as the handle 34 is released it is returned to its normal position by a spring 475 (Figs. 4 and 5), permitting the switch 474 to return at once to an open position.

During the instant that the switch 474 is closed, however, a circuit is established as illustrated in Fig. 45 for energizing the electromagnet 176 through which inward movement of the cutting board is initiated. The closing of the switch 474 establishes a circuit through the winding of the electromagnet 176 which may be traced from conductor 462 through conductor 476, switch 474, conductor 478, the winding of electromagnet 176, conductor 480, a conductive switch member 482, and conductor 484, back to conductor 468.

As a consequence of the energization of electromagnet 176, the pin 172, as has been pointed out, is lifted to a non-obstructing position with respect to the transmission arm 154, to make the clutch 30 effective to drive the cutting board operating shaft 136 (Figs. 19 and 21) through a half revolution, and to cause a full inward or rearward operating stroke to be imparted to the cutting board. As has also been pointed out, the projecting of the pin 172a downward to an obstructing position where it will render the clutch ineffective at the end of a half revolution is accomplished concomitantly with the raising of the pin 172 by the electromagnet 176.

As the shaft 136 turns to drive the cutting board inward or rearward it carries crank arm 212 (see particularly Fig. 16) in a clockwise direction and causes the high point of a cam formation 486 at the outer end of the crank 212 to ride under a follower roller 488 just as the crank arm comes to rest with the cutting board at its inner limit of movement. The follower 488 serves to actuate mechanism for initiating the downward stroke of the ram 22.

The follower is carried upon a link 490. The link is formed near its inner end with a slot 492 through which the shank of a headed pin 494, carried by an extension 496 of the bracket 132, is passed. The outer end of the link 490 is twisted and is pivotally connected to an arm 498 (Fig. 34) fast on a rock shaft 500 (see also Figs. 12, 33, 35, 36 and 37). The shaft 500 also has fast upon it an arm which carries a pawl 504. The pawl 504 is normally held upward to occupy the position illustrated in Fig. 33 by a spring 506, which is connected to the pawl and to a further arm 508 (see Fig. 34) fast on the shaft 500.

The pawl 504 in its position as illustrated in Fig. 33 is in engagement with a sleeve 510 which is a fixed part of a link 512. The link 512 is pivotally connected at one end to an arm 514 rockably mounted upon a pivot pin 517. The link 512 is connected at its opposite end through a slot 516 and a pin 518 to an arm 520 fast on a shaft 522.

The shaft 522 is supported in a two-armed bracket 523, which bracket is supported from the cover 438 of the lefthand bearing 434.

The leftward movement of the link 512 produced by an actuation of the pawl 504 is idle with respect to the arm 520.

Figure 34:
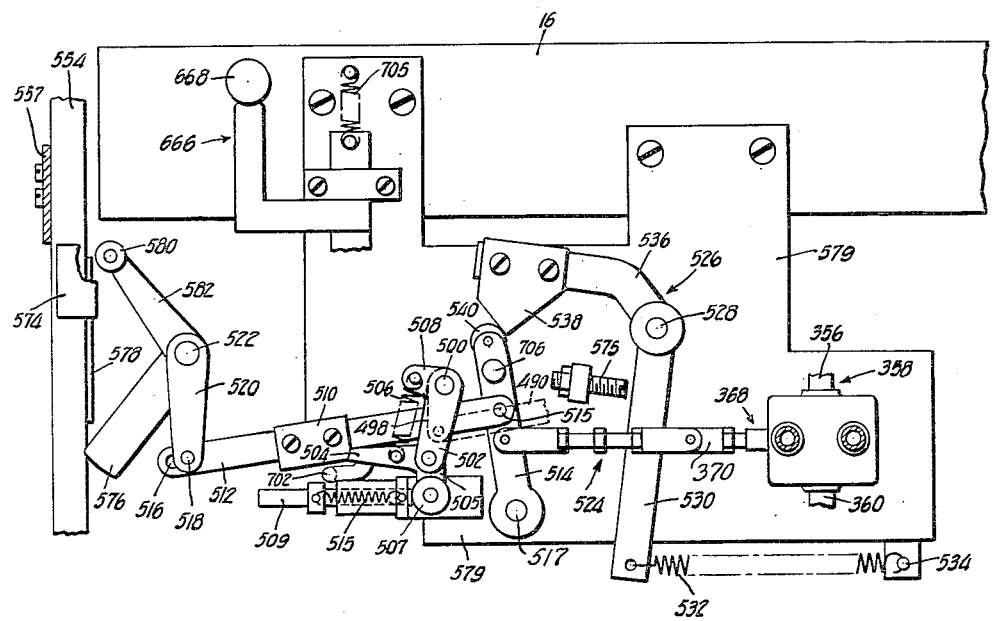
Fig. 34 is a fragmentary detail view similar to a portion of Fig. 33, but on a larger scale, and showing the valve operating parts as they would appear just as the ram starts its downward movement.

The leftward movement of the link 512, however, pulls the arm 514 in a counter-clockwise direction from the position illustrated in Fig. 33 to that illustrated in Fig. 34. The arm 514 in the course of this movement pulls an adjustable link 524 toward the left, and acts through the link to shift slide valve 368 from its normal position as shown in Fig. 29 to its lefthand position as shown in Fig. 30.

As has previously been pointed out, this causes the upper cylinders 36 and 36A to be supplied with oil under pressure while connecting the lower cylinders 38 and 38A to the discharge pipe 360, for effecting a downward stroke of the ram.

For completing the stroke of the valve rod 368 toward the left and of avoiding ambiguity as to the position of the valve, a bell crank lever 526 is mounted upon a pivot 528. The lower arm 530 of the bell crank 526 is connected through a spring 532 to a stationary pin 534. The spring tends always to urge the bell crank lever in a counter-clockwise direction as viewed in Figs. 33 to 37. The upper arm 536 of the bell crank 526 has affixed to it a pointed cam 538 which constantly engages a roller 540 carried by the arm 514.

In the Fig. 33 position the tendency of the cam 538 is to urge the arm 514 in a clockwise direction. As the arm is forced toward the left and crosses the point of the cam 538, the tendency of the cam is to snap in on the right hand side of the arm 514 as seen in Fig. 34 and to urge the arm 514 to its left hand limit of movement as illustrated in Fig. 34.

As an incident of the operation of the clutch shaft 136 for producing inward movement of the cutting board, the switch member 482 is operated from the position illustrated in Fig. 45 to the position illustrated in Fig. 46 in preparation for subsequently initiating an outward movement of the cutting board. Such shifting of the switch member does not immediately produce any result but merely sets up one of two conditions precedent to the initiation of outward cutting board movement.

The mechanism for shifting the switch member 482 comprises the bell crank 220 (see particularly Fig. 17) which is pivoted upon the shaft 222. The bell crank 220 carries upon one arm an adjustable screw 542 and upon the other arm an adjustable screw 544. The screws 542 and 544 are widely spaced from one another and stand at opposite sides of a narrow switch actuating arm 546, which arm is also freely pivoted on the shaft 222. The arm 546 has its end portion formed with an oversize opening 548 (Fig. 18) to surround a portion of a link 550.

The link 550 comprises a rod 551 having an enlarged portion or collar 553 provided in the portion that passes through the arm 546. Sleeves 555 disposed at opposite sides of the collar 553 are slidable on the rod 551 and partway on the collar, being formed with shouldered bores 557. Compression coil springs 559 surround the rod 551 between the slidable sleeves 555 and fixed collars 561, and yieldably urge the sleeves toward the collar 553. With the arrangement described force of the arm 546 is yieldingly transmitted to the link 550 in opposite directions through the respective sleeves 555 and springs 559. The link 550 is connected to an operating crank 550a, forming part of a switch 552, which it urges yieldingly to one or the other of its limits of movement. This switch is a double throw, double pole, toggle switch of which the member 482 (Figs. 44 to 48) constitutes the movable conductive member.

As the parts are illustrated in Fig. 17 the mechanism is ready to start an inward stroke of the cutting board, the arms 546 and 550a are in their down position and the member 482 is in its "up" position as shown in Figs. 44 and 45. As the bell crank 220 is swung counter-clockwise during the inward movement of the cutting board it carries the screw 544 away from the arm 546 and the screw 542 toward the arm 546. Near the end of such movement, the screw 542 engages the arm 546 and moves it upward causing motion to be transferred from the link 550 to the arm 550a. Just at the conclusion of the inward movement of the cutting board the arm 550a causes the switch member 482 to be switched over to its down position as illustrated in Fig. 46.

Nothing further happens with reference to actuation of the cutting board, however, until the ram has completed its downward movement and has substantially completed its upward or return movement.

As the ram travels downward, it carries with it a non-circular cam rod 554, preferably square (Figs. 32–40), through which the valve link 524 is caused to be shifted for reversing the setting of the slide valve 368 at the conclusion of the downward stroke of the ram and for effecting other timed operations as will be described. The shifting of the slide valve 368 from the Fig. 30 position to the Fig. 31 position is effective, as has already been explained, to reverse the direction of movement of the ram.

The cam rod 554 (Figs. 32 and 33) is slidably mounted in a bracket 556 at its lower end, the bracket being affixed to the base 10 of the machine. The bracket also prevents rotation of the rod. The rod 554 has affixed to it a threaded stem 558 which extends upward through a feed nut 560. The feed nut is provided with an operating hand wheel 562, which is used for adjusting the rod relative to the ram in the direction of ram movement. The nut 560 has a reduced lower end portion 564 which extends downward through a split extension 566 of the ram. The lower end portion 564 of the nut 560 has a collar 568 affixed to it by means of a set screw 570 so that the nut 560 while normally free to rotate has no freedom for longitudinal movement relative to the ram. The split portions of the extension 566 are formed with ears 572 which may be drawn toward one another by a clamping screw 574 to cause the extensions to bind upon the reduced portions 564 of the nut 560 and lock the nut against rotation when a desired adjustment has been secured.

Figure 35:
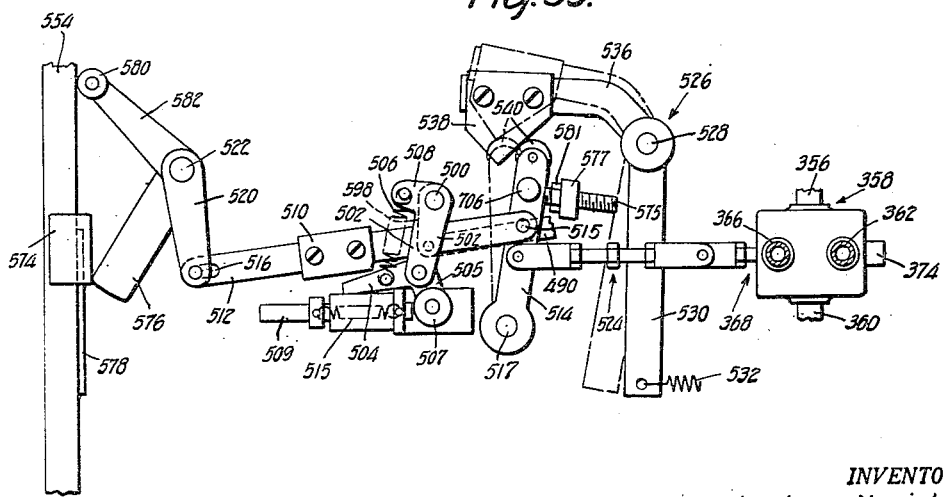
Fig. 35 is a view similar to Fig. 34, but shows the valve operating parts as they would appear when the ram is just starting its upward movement.

The rod 554 has fixed upon it a cam 574 (see Fig. 35 also) which is carried downward by the rod to engage and actuate in a counter-clockwise direction an arm 576 fast on the rock shaft 522 as the rod nears the limit of its downward movement. As the result of this movement the arm 520 is shifted in a counter-clockwise direction to cause the link 512 to move toward the right, thereby permitting the lever 514 to be shifted from the full line position of Fig. 34 to the broken line position of Fig. 35. The arm 520 is not capable itself of directly swinging the arm 514 farther to the right than the broken line position of Fig. 35 but, as will be observed, the follower 540 has moved to the right across the point of the cam 538 so that the spring 532, acting through the bell crank 526 and the cam 538, completes the movement of the arm 514 to the full line position shown in Fig. 35, where it is arrested by a stop screw 575 which is threaded through an ear 577 of a bracket 579. A lock nut 581 maintains the adjusted position of the screw. This last portion of the arm movement shifts the slot 516 relative to the pin 518, causing the pin to occupy the left hand extremity of the slot 516 as shown in Fig. 35.

At the time when the rod 512 is shifted toward the right to reverse the valve, as described above, the cutting board is still maintained at its inward limit of movement and the crank 212 occupies the position illustrated in Figs. 12 and 16. In this position the crank prevents counter-clockwise movement of the arm 502 away from the position illustrated in Fig. 35. Provision is accordingly made for temporarily breaking the connection between the pawl 504 (carried by arm 502) and the sleeve 510 at the conclusion of the leftward movement of the sleeve by the pawl, previously described.

It will be observed (Figs. 33 and 34) that the pawl 504 normally engages a beveled face of the sleeve 510. The pawl is made in the form of a bell-crank, having a downwardly extending arm 505 in which a roller 507 is carried for engaging a spring pressed plunger 509. The plunger 509 is slidably mounted in a guide 511, affixed to a stationary bracket 513. The plunger 509 is drawn toward the right by a light spring 515 which is connected at one end to a collar 517 fast on the plunger and at the other end to a part of the stationary bracket 513.

As the pawl moves leftward the friction between the pawl and the beveled face of sleeve 510 is sufficient to prevent the plunger from swinging the pawl off the beveled face. As the roller 540 crosses the point of the cam 538 in moving from left to right, however, the sleeve 510 is moved away from contact with the pawl. Therefore, the spring 515, acting through the plunger 509, is able to overcome the spring 506 and swing the pawl down out of line with the sleeve 510. The pawl remains out of line with the sleeve 510 until after the link 512 has been moved to the right to reverse the valve 368.

The shifting of the arm 514 toward the right is effective through the link 524 and the rod 370 to shift the valve 368 from the position shown in Fig. 30 to that shown in Fig. 31. This, as has been previously explained, reverses the connections of the upper and lower cylinders, disconnecting the upper cylinders from the pressure supply conduit 356 and connecting them to the discharge conduit 360, while disconnecting the lower cylinders from the discharge conduit 360 and connecting them to the pressure supply conduit 356. When this shifting of the valve occurs, the ram is caused to perform its upward or return stroke. As the ram travels upward it is required both that the valve 368 be shifted to the neutral condition illustrated in Fig. 29 to terminate the upward ram movement, and that outward movement of the cutting board be initiated.

For the purpose of terminating upward movement of the ram a cam 578 is adjustably mounted (Figs. 32 and 33) on the cam rod 554 by means of screws which are passed through a slot of the cam and threaded into the rod 554. As the cam rod 554 nears the limit of its upward movement the cam 578 engages a roller 580 carried by an arm 582 which is fast upon the rock shaft 522, to rock the shaft 522 in a clockwise direction. This causes the arm 520 immediately to pull the link 512 toward the left for restoring the arm 514 to its normal position as illustrated in Fig. 33. This shifts the valve 368 to the position illustrated in Fig. 29, which immediately results in bringing the ram to rest.

For initiating outward movement of the cutting board at or near the conclusion of the upward movement of the ram, provision is made of a mercury switch 584 controlled by the ram. The circuit conditions which must exist for initiating outward cutting board movement are illustrated in Fig. 46. Here the switch member 482 is shown in its down position and the mercury switch 584 is shown in its closed position.

While the switch member 482 is shifted from the upper to the lower contacts of switch 552 as an incident of the inward operation of the cutting board, the switch 584 remains in its open position, as illustrated in Figs. 44 and 45, until the upward stroke of the ram is begun. Then the switch 584 is swung to the closed condition illustrated in Fig. 46 to complete a circuit from conductor 462 through switch 584, conductor 586 and 478 and 588, the winding of electro-magnet 176A, conductor 590, switch member 482 and conductor 592 back to conductor 468. This, as will be apparent, energizes the winding of electro-magnet 176A, causing the pin 172A to be raised and the pin 172 to be lowered as has already been explained.

For controlling the switch 584 the cam rod 554 is provided with an adjustable cam 592 (see particularly Figs. 38 and 39). The cam 592 is formed with a slot 593. Screws 595 and 597 are passed through the slot 593 and threaded into the rod 554. As viewed in Fig. 39 the cam rod 554 is at the upper limit of its movement, which means that the ram is in its uppermost position. The cam 592 includes a beveled face 594 at its lower end and a vertical face 596, both of which are adapted to engage and coact with a follower roller 598.

The follower 598 is carried by an arm 600, the arm being pivotally mounted upon a shaft 602 carried from the under face of the table 16 by a bracket 604. Late in the downward travel of the cam 592 the beveled face 594 engages the follower roller 598 to rock the arm 600 in a counter-clockwise direction, and the vertical face 596 maintains the displaced condition of the arm 600 throughout the remainder of the down-stroke of the ram and a portion of the up-stroke.

The initial displacement of the arm 600 during the down-stroke has no immediate and direct effect upon the mercury switch 584, but it does condition the switch operating mechanism so that the switch will be tilted to closed position as the arm 600, in riding off the cam 592 is restored to its normal position.

An arm 605 fast on arm 600 (see Figs. 40, 41 and 43 also) carries a pawl 606 for engaging a ratchet wheel 608, also mounted for rotation upon the shaft 602. The pawl 606 is pivotally supported upon a pin 610 carried by the arm 605. A spring 612 connected to pins 614 and 616 of the pawl 606 and the arm 605, respectively, constantly urges the pawl toward the ratchet wheel 608. A spring 618 connected to a stationary pin 620 and to the pin 610 urges the arm 600 to its clockwise limit of movement as determined by a stop pin 622.

A pawl 624 pivotally mounted upon the bracket 604 by means of a pin 626 prevents counter-clockwise movement of the ratchet wheel 608. The pawl 624 is biased toward the ratchet wheel 608 by a spring 628 connected to a stationary pin 630 and to the tail 632 of the pawl. As the arm 600 is displaced in a counterclockwise direction during the down-stroke of the ram, the pawl 606 is retracted approximately one tooth space relative to the stationary ratchet wheel 608. As the arm 600 starts upward near the beginning of the up-stroke of the ram (see Fig. 39) the ratchet wheel 608 is fed one tooth space in a clockwise direction.

The ratchet wheel 608 engages a pawl 634 which is fast upon a shaft 636. The shaft 636 is rotatably mounted in an extension 638 of the bracket 604. The bracket extension 638 also carries a rock shaft 640 upon which the mercury switch 584 is carried by means of a clip 642. The clip 642 comprises two pairs of spring arms which embrace the tube 644 of the mercury switch. The shaft 640 has fast upon it an arm 646 through which the shaft is urged in a clockwise direction by a spring 648. The spring is connected to pins 650 and 652 carried, respectively, by the arm 646 and the bracket extension 638.

The shaft 636, which is fast with the pawl 634, also has fast upon it a curved arm 654 which extends around beneath the shaft 640 and bears upward against the lower face of the arm 646. The arm 654 normally rests upon a stationary pin 656 carried by the bracket extension 638. Normally, the mercury switch occupies the attitude illustrated in Fig. 41, being maintained in that position by the spring 648 acting through the arm 646. As the ratchet wheel 608 advances a tooth space, however, during upward ram movement, at the stage when the arm rides off the cam 592, the pawl 634 rides up a tooth of the ratchet and then snaps off the tooth to return to its original position.

The motion of the pawl 634 is transmitted through the arm 654 to rock the arm 646 in a counterclockwise direction, so that the mercury switch 584 is rocked for just an instant into its circuit closing condition, as illustrated in Fig. 46. The instant that the point of the pawl 634 crosses the tip of the engaged tooth, the pawl snaps back into normal position and the mercury switch is returned to its normal or open position.

The mercury switch 584 is of conventional construction, being illustrated in detail in Fig. 43. It comprises a glass tube 644 mounted to rock about the axis of the shaft 640. It contains a pair of electrodes 658 and 660 in its left-hand end and a quantity of mercury 662. When in the open position as illustrated in Fig. 43, the mercury is in the right hand end of the tube and does not reach the electrodes 658 and 660, so that the circuit of which the electrodes form a part is open. When the switch is tilted to the position of Fig. 46, however, the mercury 662 shifts to the opposite end of the tube and electrically connects the electrodes 658 and 660. The circuit established by the closing of the mercury switch is illustrated in Fig. 46 and has already been described. As a consequence of the instantaneous closing of this circuit, the electromagnet 176A is energized and outward movement of the cutting board is initiated, as has been explained.

Since the manner in which the energization of electromagnet 176A is effective through actuation of the pins 172A and 172 to produce the outward movement of the cutting board has already been made clear, the completion of the description of the cutting board cycle requires only that the restoration of the switch member 482 to its upper position as an incident of the outward movement of the cutting board be explained, so that the complete restoration of the normal starting conditions will be understood.

As the crank 212 moves from the Fig. 16 position to the Fig. 17 position for moving the cutting board outward or forward, it rocks the bell crank 220 clockwise. Near the end of such rocking, the screw 544 engages the arm 546, and through the link 550 swings the operating arm 550A of the switch 552 in a counter-clockwise direction (as viewed in Fig. 17) to reverse the condition of the switch 552.

During the return of the cutting board the crank 212 moves out from under the follower 488 of the link 490, thereby permitting the link to be restored to normal position by a tension spring 661 which is connected to the link and to the bracket 496. This rocks the arm 502 counter-clockwise and restores the pawl 504 to operative engagement with the sleeve 510 (Fig. 33).

The normal operation may be summarized briefly as follows:

Inward movement of the cutting board 20 (Figs. 1 and 5) is initiated by a momentary actuation of the switch handle 34 to energize electromagnet 176 (Figs. 19, 20 and 45). The cutting board is thereupon moved inward and brought to rest (Figs. 4 and 16). As it moves inward, however, its operating mechanism shifts the valve 368 into position (Fig. 30) to produce a downward stroke of the ram 22.

Downward movement of the ram, in turn, automatically produces a reversal of the position of the valve 368 (Fig. 31) causing the upward stroke of the ram to follow immediately upon the conclusion of the downward stroke.

Upward movement of the ram automatically shifts the valve 368, to the position in Fig. 29, to terminate upward movement of the ram at the proper point, and also energizes the electromagnet 176A (Fig. 46) causing the cutting board to be returned to its outward or forward position. As an incident of the outward movement of the cutting board, the normal starting condition of the electrical control circuit (Fig. 44) is fully established.

While reference has been made to the adjustability of the cam rod 554 and to the adjustability of the upper limit cam 578 and the mercury switch cam 592 on the rod, the use and importance of these features require explanation and emphasis.

It is important that the die be driven cleanly through the last or lowest sheet of a stack. At the same time, however, it is desirable that the downward stroke be arrested as nearly as possible with the lower face of the die just touching, but not penetrating, the cutting board. In any die press the cutting board is inevitably cut into and roughened progressively. It must from time to time be shaved or sanded on its upper face, so that it is gradually eaten away from an initial thickness of about four inches to a final thickness of about two and one-half inches. It is essential that the lower limit of ram movement be adjusted to compensate for the diminishing thickness of the cutting board. The more accurately this adjustment can be effected the longer the cutting board will last.

Adjustment of the cam rod 554 is provided for the purpose of adjusting the lower limit or reversing cam 574 (Figs. 32 and 33) which is fixed on the rod 554. To aid the operator in effecting this adjustment, an index pointer 708 is mounted on the rod at the upper end thereof for co-operation with a graduated scale 710 which is mounted upon a portion of the ram 22. The adjusting wheel 562 may itself be graduated in degrees and compared with a reference mark on the ram so that a very fine vernier adjustment is provided. By the means described, the operator is enabled to secure with extreme precision the proper lower limit of ram travel as determined by measurement of the height of the die above the table when set upon the cutting board.

Adjustment of the rod 554 incidentally adjusts the upper limit cam 578. This adjustment, therefore, changes the upper and lower limits of ram movement correspondingly without changing the stroke of the ram. It is highly desirable, however, to be able to change the stroke of the ram, since the actual requirements may vary between a cutting stroke of two inches and a cutting stroke of eight and one-half inches.

In the prior art no adjustment of stroke was provided, and hence it was necessary to operate the ram through the maximum stroke at all times, in order that it might meet the requirements of a stack and die combination of maximum thickness. In the prior art constructions, moreover, where the ram was constantly in operation, it was necessary to provide a considerable excess of stroke because the stack and die had to be moved fully into cutting position as the ram moved above, and returned, downward to, the level of the top of the die.

In the illustrative machine of the present invention the ram stroke can be adjusted to any value between two inches and eight and one-half inches, simply by adjusting the upper limit cam 578 relative to the rod 554. As shown in Fig. 33, the cam 578 is set in its lowest possible position relative to the rod 554. This means that the cam 578 will not act through the roller 580 to terminate upward movement of the ram until the ram has moved upward a distance of eight and one-half inches from its lower limit of movement. If, however, the cam 578 is adjusted upward a distance of six and one-half inches relative to the rod, the ram stroke will be cut down to two inches. Any intermediate length of stroke desired between two inches and eight and one-half inches can obviously be obtained.

The adjustment of the ram stroke is of very great importance. While the press is only capable of operating approximately three times a minute when set for a stroke of eight and one-half inches, it is capable of operating more than four times as fast when set for a stroke of two inches. This is desirable because the operators of these presses are capable of operating more rapidly on the smaller, lighter work than upon the larger, heavier work.

A substantial saving of the electrical energy consumed by the pump motor can, moreover, be realized by not driving the ram through an unnecessarily long stroke. The amount of oil used is proportional to the stroke length. If a comparatively small quantity of oil under pressure is utilized during a ram cycle, the pressure in the hydraulic system is more quickly restored to the maximum value for which the handle 352 is set, and the pump may then operate for a greater proportion of the time against substantially no load because the waste conduit 329 will be placed in communication with the conduit 318 as soon as the maximum pressure is restored.

It is desirable that the mercury switch be tripped not before the ram has started its upward movement, but promptly after such movement has been started. The mercury switch operating cam 592 should be adjusted to bring about this mode of operation. Since the timing of the mercury switch bears a uniform relation to the timing of the lower limit switch, there is no need to readjust the cam 592 relative to the rod 554 after adjustment of the rod. The adjustment of the cam 592 relative to the rod 554 is merely a factory adjustment.

While this concludes the description of the normal operation, it is also desirable at times to effect the several operations piecemeal.

It is desirable for several reasons to be able to shift the cutting board actuating bar 70 inward or rearward without producing ram operation and thereafter to restore the bar to normal position.

When it is desired, for example, to change the connection between the actuating slide 70 (Figs. 1, 7, 8 and 9) and the connector 60 in order to change the range of operation of the cutting board, connector handle 114 may first be operated manually to withdraw the effective one of pins 78 and 80 and to urge the other of these pins toward effective position.

If it is the purpose to make the pin 80 ineffective and the pin 78 effective, the handle 114 is operated appropriately with the actuating bar 70 in its outer or forward position (Fig. 8). The actuating bar 70 is then power operated inward without producing ram operation to carry the hole 92 into register with the now stationary pin 78. The actuating bar 70 is next restored to its outer position by a second tripping action without any operation of the ram having been produced.

If, on the other hand, it is the purpose to make the pin 78 ineffective and the pin 80 effective, the actuating bar with the cutting board connected is first operated inward or rearward to the position in Fig. 4, in such a way as not to produce ram operation. While the actuating bar 70 is in its rearward position, the handle 114 is actuated to disengage the pin 78 and to urge the pin 80 toward effective position. Through a manual tripping operation, the actuating bar 70 is now restored independently of the board 24, to its forward position, without any ram operation having been produced. At the limit of forward movement of the actuating bar 70 the pin 80 snaps into the hole 94 to establish the new connection (Fig. 8). In the event the operator disconnects the pin 78 before the operation of the actuating bar rearwardly the bar ought not to be free to pull away from the connector 60. There is accordingly provided a pin 663 which engages the portion 62 to push the connector inward.

It is desirable at times to operate the cutting board without operating the ram in order to assist the operator in disposing of waste paper to the rear of the machine.

A further reason for operating the cutting board independently of ram operation occurs when a fresh stack of sheets has been placed on the cutting board. In this situation, it is desirable to operate the cutting board to its rearward position and then to inspect the disposition of the sheets while the cutting board stands stationary. This also affords an opportunity to make sure that there is comfortable clearance between the ram and the die on the work sheets.

The operator first folds the topmost sheet to form a transverse crease midway of its length, lays it on the stack in register with one end thereof, operates the cutting board rearward to carry the folded sheet under the ram, and adjusts the stack relative to the ram by reference to the folded sheet.

Still another reason for operating the cutting board without producing ram operation arises when it is desired to try out the clutch mechanism through which the cutting board is driven without operating upon any work.

For the purpose of bringing about inward operation of the cutting board without automatically producing ram operation, a secondary starting switch 664 (Figs. 33, 36, 37, 44, 47 and 48) is provided, the switch being operated by a control mechanism 666 which comprises a handle portion 668. When the parts are in the normal starting condition and the switch 664 is closed, as illustrated in Fig. 47, a circuit is established from conductor 462 through a conductor 670, the switch 664, conductors 672, 586 and 478, electromagnet 176, conductor 480, switch member 482 and conductor 484 back to conductor 468.

The electrical effect of closing the switch 664 is the same as that of closing the switch 474, the two switches being alternative, parallel means of producing energization of the electromagnet 176. The difference, however, resides in a mechanical effect produced by the actuation of the operating mechanism 666.

The handle 668 is affixed to a slide rod 674 which is guided for vertical reciprocation in upper and lower guides 676 and 678, which are affixed to the table-carried bracket 579. The slide rod 674 has affixed to it a side arm 682 which carries a screw 684 for engaging and actuating a switch closing plunger 686 of the switch 664. The switch comprises a casing 688, a lower stationary contact 690 and an upper movable contact 692, the upper contact being responsive to the plunger 686, and the plunger being normally retained in its upper or switch opening position.

The normal condition of the handle 668 and the parts directly operated by it is that illustrated in Figs. 33 and 44. Here it will be observed that the slide rod 674 is formed with a side notch 694 normally disengaged from a pawl 696, but adapted to become engaged with the pawl, when the slide rod 674 is depressed, by a pawl actuating spring 697 (Fig. 44). A rock shaft 698 to which the pawl 696 is secured, also has fast upon it an arm 700 through which the pawl 696 can be rocked out of engagement with the notch 694 by mechanism which will be described and explained presently.

Figure 36:
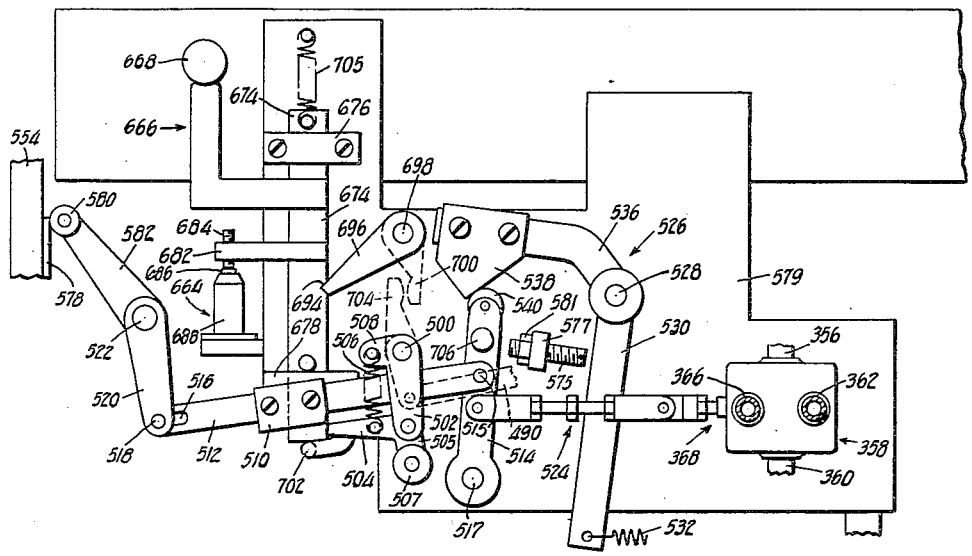
Fig. 36 is a view similar to Fig. 34, but shows a secondary control handle depressed to cause the cutting board to move inward without producing any operation of the ram.
Figure 37:
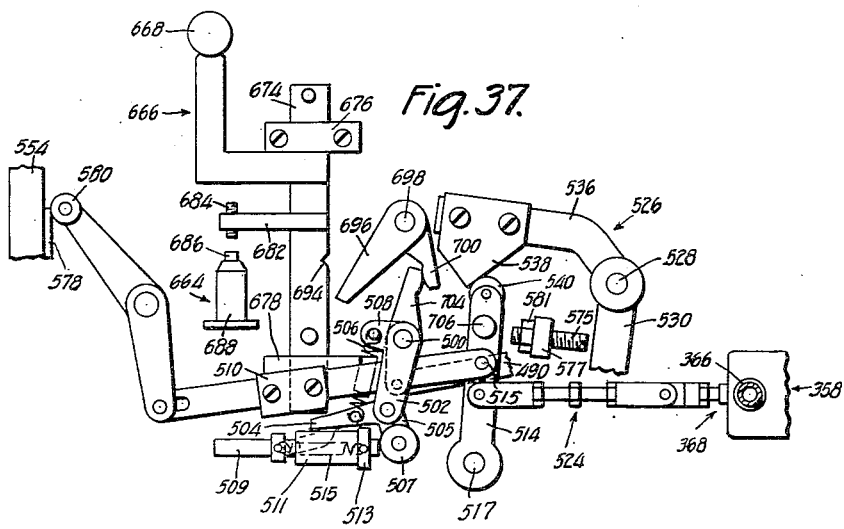
Fig. 37 is a view similar to Fig. 36, but shows the secondary control released and the parts in the positions occupied by them at the end of the in-stroke of the cutting board.

It will be remembered that as an incident of operation of the clutch shaft 136 (Fig. 21) to effect normal inward movement of the cutting board, motion is transmitted from the pawl 504 (Fig. 33) through the collar 510 to the rod 512 for producing operation of the valve 368 to bring about downward movement of the ram. When inward motion of the cutting board is initiated by operation of the handle 668, however, the slide rod 674 disables the pawl 504, disengaging it from the collar 510 as in Fig. 36 and causing it when moved by the arm 502 to be ineffectual to transmit motion to the link 512. For this purpose the pawl 504 is provided with an extension finger 702 which normally lies directly beneath the plunger rod 674 (Fig. 33) in position to be engaged and displaced downward by the rod as the rod is thrust downward. As seen in Fig. 36, the rod has been thrust downward by the handle 668 and locked in its lower position by the pawl 696. As there shown arm 502 has not as yet been displaced, however, from its initial position. When the arm 502 is swung clockwise to move the pawl 504 to the left, the nose of the pawl travels beneath the sleeve 510 as illustrated in Fig. 37.

The rock shaft 500 upon which the arm 502 is made fast, and by which motion is transmitted to the arm 502, also has fast upon it an upstanding arm 704. The rocking of the shaft 500 in a clockwise direction carries the arm 704 against the arm 700, which arm, acting through the shaft 698, disengages the pawl 696 from the notch 694 of the slide rod 674. When this occurs, the slide rod is restored to its upper or normal position by a spring 705, thereby causing the switch 664 to be restored to its normal open position. When the cutting board comes to rest at the conclusion of its inward stroke, therefore, the switch 664 is open.

Figure 48:
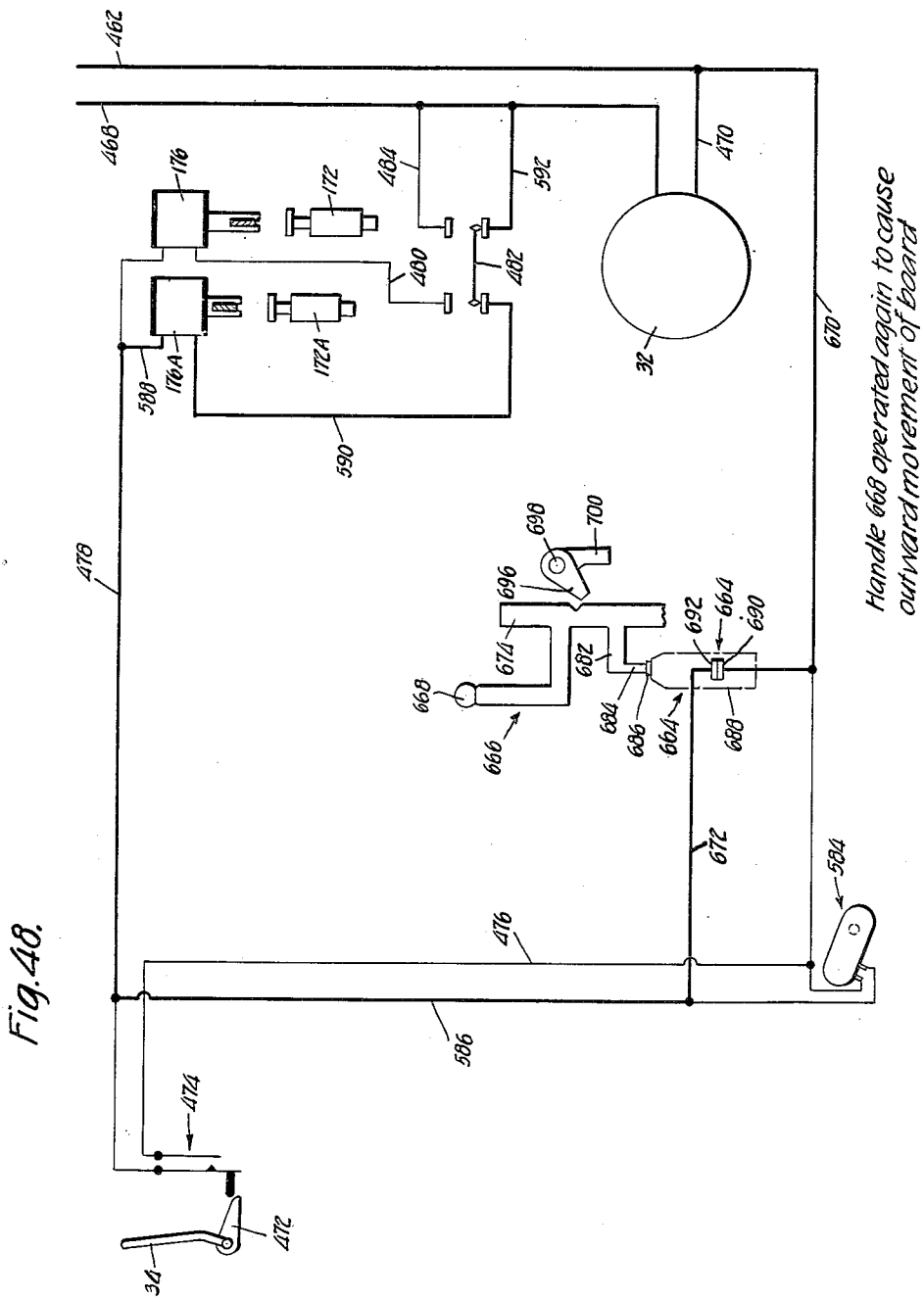

While the ram was not set into operation as an incident of the inward movement of the cutting board, switch member 482 was, nevertheless, shifted from its original or upper position as illustrated in Fig. 44 to its lower position, as illustrated, for example, in Fig. 48. The condition of the circuit parts at the conclusion of the inward movement of the cutting board is, therefore, as illustrated in Fig. 48, save that the handle 668 and the slide bar 674 would be in the upper positions to hold the switch 664 open. At this time the pawl 696 is held away from the slide rod 674, so that it cannot engage and detain the slide rod in a lower position when the slide rod is again manually depressed, as shown in Fig. 48, to initiate outward movement of the cutting board.

When the handle 668 is now depressed it establishes a circuit from conductor 462 through conductor 670, switch 664, conductors 672, 586 and 478, the winding of electromagnet 176A, conductor 590, switch member 482, and conductor 592 back to conductor 468. The handle 668 requires to be depressed only for an instant since an instantaneous closing of the switch 664 produces the desired outward movement of the cutting board. The handle 668 is, therefore, depressed and then immediately released, the slide rod 674 returning at once to its upper position because of the incapacity of the pawl 696 to detain it at this time.

As an incident of the outward movement of the cutting board, the switch member 482 is shifted from its lower position as illustrated in Fig. 48 to its upper position as illustrated in Fig. 45, as described in connection with the normal outward operation of the cutting board.

It may sometimes happen that the die is improperly placed upon a stack of sheets, being either in a wrong location or upside down, and that the error is discovered only after a normal cycle of operations has been initiated. In such a case it is important that the operator be able to arrest and reverse operation of the ram after the ram has started downward.

For this purpose the arm 514 is provided with a manual operating handle 706 (Fig. 33). The handle 706 can be seized quickly and thrust toward the right.

There are times when it is desirable in testing or repairing the mechanism to operate the ram very slowly or step by step. This can be done by turning the screw 575 (Fig. 35) far enough from its normal position to open the valve 368 slightly. The ram can be arrested as desired by turning the screw a small amount in the opposite direction. By firmly regulating the screw the ram can be lowered as slowly or through as many steps as desired. Such operation of the screw 575 does not disturb the position of the nut 581 relative to the screw. When the normal setting is again desired, therefore, it may be reestablished simply by turning the screw until the nut 581 is again pressed firmly against the ear 577. Such resetting of the screw also brings about the return of the ram to its upper limit of movement.

I have described what I believe to be the best embodiments of my invention. I do not wish, however, to be confined to the embodiments shown, but what I desire to cover by Letters Patent is set forth in the appended claims.

I claim:

1. A die press comprising, in combination, a stationary frame, which includes a generally rectangular work supporting table and hollow legs supporting the table at its four corners, a ram, a pair of operating pistons connected to the ram at widely spaced opposite side extremities thereof, cylinders in which the pistons are operative, common hydraulic mechanism for operating the pistons simultaneously, and equalizing mechanism for compelling the opposite sides of the ram to travel in unison, notwithstanding unequal resistances encountered at the opposite sides, said equalizing mechanism comprising a pair of transversely extending shafts carried by the frame beneath the table, pinions fast upon the opposite ends of both shafts, and racks carried by the ram in mesh with the respective pinions, said racks being operable in the respective hollow legs upon which the table is supported.

2. A die press as set forth in claim 1 in which adjustable guide shoes are provided in the respective hollow legs opposite the pinions for engaging the racks and maintaining them in proper mesh with the respective pinions.

3. In a die press, in combination, a stationary table, a ram disposed above the table and operable toward and from the table, a normally idle cutting board operable to and from cutting position on the table, and mechanism for operating the cutting board inward from a retracted position to a cutting position comprising a constantly running motor, a half revolution clutch having a constantly rotating input member driven by the motor, a normally idle output member adapted to be driven at times by the input member, means for tripping the clutch, means to release the clutch automatically at the end of a half revolution, and transmission mechanism constructed and arranged to translate a half revolution of the driven member into an inward stroke of the cutting board.

4. In a die press, in combination, a stationary table, a ram disposed above the table and operable toward and from the table, a normally idle cutting board operable to and from cutting position on the table, and mechanism for operating the cutting board between retracted and cutting positions comprising a constantly running motor, a clutch having a constantly rotating input member driven by the motor and a normally idle output member adapted to be rotated at times by the input member, means for tripping the clutch, means to release the clutch automatically at the end of a half revolution, and transmission mechanism constructed and arranged to translate a half revolution of the output member into a right line movement of the cutting board, substantially sinusoidally varied as to speed.

5. In a die press, in combination, a stationary table, a ram disposed above the table and operable toward and from the table, a normally idle cutting board operable to and from cutting position on the table, and mechanism for operating the cutting board between retracted and cutting positions comprising a constantly running motor, a clutch having a constantly rotating input member driven by the motor and a normally idle output member adapted to be rotated at times by the input member, a driving arm rockably carried by the output member and spring urged toward a position to be drivingly engaged by the input member, and a pair of obstructing pins located diametrically opposite one another, each pin adapted to be withdrawn from the path of the driving arm to bring about driving of the output member and to be projected into the path of the driving arm to arrest the arm and force it out of engagement with the input member, and transmission mechanism connected and arranged to translate a half revolution of the output member into a right line movement of the cutting board.

6. In a die press, in combination, a stationary table, a ram disposed above the table and operable toward and from the table, a normally idle cutting board operable to and from cutting position on the table, and mechanism for operating the cutting board between retracted and cutting positions comprising a constantly running motor, a clutch having a constantly rotating input member driven by the motor and a normally idle output member adapted to be rotated at times by the input member, a driving arm rockably carried by the output member and spring urged toward a position to be drivingly engaged by the input member, and a pair of obstructing pins located diametrically opposite one another, each pin adapted to be withdrawn from the path of the driving arm to bring about driving of the output member and to be projected into the path of the driving arm to arrest the arm and force it out of engagement with the input member, transmission mechanism constructed and arranged to translate a half revolution of the output member into a right line movement of the cutting board, and interconnecting mechanism for compelling each of the pins to be projected into its obstructing position as an incident of the withdrawal of the other pin from obstructing position.

7. In a die press, in combination, a cutting board, a reciprocable ram having a fore and aft dimension substantially equal to one-half the length of the cutting board, board operating mechanism constructed and arranged to reciprocate the cutting board through a range equal substantially to one-half the length of the cutting board, and means providing alternative connections between the cutting board and said operating mechanism to change the fore and aft relationship by a predetermined amount equal substantially to one-half the length of the cutting board, thereby to cause either half of the cutting board to be reciprocated to and from cutting position beneath the ram.

8. In a die press, in combination, a cutting board, a reciprocable ram having a fore and aft dimension substantially equal to an aliquot part of the length of the cutting board, board operating mechanism constructed and arranged to reciprocate the cutting board through a range equal substantially to said fore and aft dimension of the ram, and means providing alternative connections between the cutting board and said operating mechanism to change the fore and aft relationship of the board and the operating mechanism, thereby to cause different aliquot parts of the cutting board to be reciprocated to and from cutting position beneath the ram.

9. In a die press, in combination, a ram, a cutting board, and board operating mechanism constructed and arranged to reciprocate the cutting board through a range equal substantially to one-half the length of the cutting board, said operating mechanism including an actuating slide rod and a connector for connecting the cutting board to the rod at either of two points separated from one another by a distance equal substantially to the stroke of the cutting board.

10. A structure as set forth in claim 9 in which the actuating rod is provided with two driving recesses which are spaced from one another laterally and longitudinally of the actuating rod and in which the connector includes a pair of spring urged pins disposed side by side and projectable into the respective recesses of the actuating rod, and cam mechanism cooperative with the pins to withdraw one of the pins while releasing the other for engagement with the actuating rod.

11. A structure as set forth in claim 9 in which the actuating rod is provided with two driving recesses which are spaced from one another laterally and longitudinally of the actuating rod and in which the connector includes a pair of spring urged pins disposed side by side and projectable into the respective recesses of the actuating rod, cam mechanism cooperative with the pins to withdraw one of the pins while releasing the other for engagement with the actuating rod, a handle for the cam mechanism, and means for latching the handle in selected positions.

12. In a die press, in combination, a normally idle cutting board reciprocable to and from cutting position, mechanism for operating the cutting board comprising a constantly running input member, a normally idle output member, and a half revolution clutch interposed between said members, a pair of control pins arranged to be withdrawn in alternation to initiate operation of the output member and each arranged to be projected to an arresting position as an incident of the withdrawal of the other, and electrical circuit control means comprising pin withdrawing electromagnets associated with the respective pins, the first of said electromagnets being energized to initiate inward movement of the cutting board and the second being energized to initiate outward movement of the cutting board, a shiftable switch initially in circuit with the first electromagnet but shiftable into circuit with the second, switch shifting mechanism operated as an incident of inward movement of the cutting board to render the first electromagnet inoperable and the second electromagnet operable and operated as an incident of outward movement of the cutting board to render the second electromagnet inoperable and the first operable.

13. In a die press, in combination, a normally idle cutting board reciprocable to and from cutting position, mechanism for operating the cutting board comprising a constantly running input member, a normally idle output member, and a half revolution clutch interposed between said members, a pair of control pins arranged to be withdrawn in alternation to initiate operation of the output member and each arranged to be projected to an arresting position as an incident of the withdrawal of the other, and electrical circuit control means comprising pin withdrawing electromagnets associated with the respective pins, the first of said electromagnets being energized to initiate inward movement of the cutting board and the second being energized to initiate outward movement of the cutting board, a shiftable switch initially in circuit with the first electromagnet but shiftable into circuit with the second, switch shifting mechanism operated as an incident of inward movement of the cutting board to render the first electromagnet inoperable and the second electromagnet operable and operated as an incident of outward movement of the cutting board to render the second electromagnet inoperable and the first operable, said circuit means also including a manually operable starting switch for energizing the first electromagnet, and a mechanically operable starting switch for energizing the second electromagnet.

14. In a die press, in combination, a normally idle cutting board, a normally idle ram, driving mechanism for the cutting board constructed and arranged to be tripped and when tripped to drive the cutting board through a single horizontal stroke, manually operated tripping mechanism for initiating an inward stroke of the cutting board, hydraulic mechanism for actuating the ram, means operated as an incident of the inward stroke of the cutting board for producing a full operating cycle of the ram, including cutting and return strokes, and mechanism responsive to the return stroke of the ram for causing the cutting board driving mechanism to initiate an outward stroke of the cutting board.

15. In a die press, in combination, a normally idle cutting board, a normally idle ram, driving mechanism for the cutting board constructed and arranged to be tripped, and when tripped to drive the cutting board through a single horizontal stroke, tripping mechanism comprising a manually operable tripping member for initiating an inward stroke of the cutting board, hydraulic mechanism for actuating the ram including a control valve normally maintained in a neutral position but operable to a first operating position for causing the ram to be driven downward, and to a second operating position for causing the ram to be driven upward, means operated automatically as an incident of the initial stroke of the cutting board for shifting the control valve to its first operating position, means operated as an incident of the downward stroke of the ram for shifting the control valve to its second operating position, means operated as an incident of the upward stroke of the ram for restoring the control valve to its neutral position, and means responsive to upward movement of the ram for initiating an outward stroke of the cutting board.

16. A structure as claimed in claim 15 in which a second or alternative manually operable tripping member is provided, together with means for preventing the shifting of the control valve to its first operating position as an incident of the inward stroke of the cutting board, whereby inward movement of the cutting board may be effected without bringing about any ram operation.

17. A structure as claimed in claim 15 in which a second or alternative manually operable tripping member is provided, together with means for preventing the shifting of the control valve to its first operating position as an incident of the inward stroke of the cutting board, whereby inward movement of the cutting board may be effected without bringing about any ram operation, and means for causing inward and outward strokes of the cutting board to be effected in alternation by successive actuations of the alternative manually operable tripping member.

18. A structure as claimed in claim 15 in which a manually operable safety handle is provided for shifting the control valve from its first to its second operating position when it is desired to suppress a downward stroke of the ram which has already been initiated.

19. In a die press, in combination, a cutting board, a normally idle ram, operating means for the cutting board including a half revolution clutch having a constantly running input member and a normally idle output member, a pair of control pins for the clutch, the first operable to arrest the output member with the cutting board at the end of an outward stroke and the second operable to arrest the output member with the cutting board at the end of an inward stroke, hydraulic mechanism for operating the ram comprising a control valve normally maintained in a neutral position, but operable to a first operating position to cause the ram to move downward, and to a second operating position to cause the ram to move upward, a first electromagnet associated with the first pin for withdrawing it from obstructing position, a second electromagnet associated with the second pin for withdrawing it from obstructing position, means for compelling each pin to be projected to obstructing position as an incident of the withdrawal of the other, electric circuit means controlling the electromagnet and comprising a switch movable as an incident of upward movement of the cutting board to a position to render the first electromagnet operable and the second inoperable, and movable as an incident of inward movement of the cutting board to a position to render the second electromagnet operable and the first inoperable, a manually operable starting switch for initiating inward movement of the cutting board, a second starting switch in parallel with the first, mechanism operated as an incident of inward movement of the cutting board to shift the control valve to its first operating position, mechanism operated as an incident of the downward movement of the ram to shift the control valve to its second operating position, and mechanism operated as an incident of upward movement of the ram to close the second starting switch, thereby to initiate outward movement of the cutting board.

20. In a die press, in combination, a cutting board, a normally idle ram, operating means for the cutting board including a half revolution clutch having a constantly running input member and a normally idle output member, control mechanism for the output member constructed and arranged to cause said member to impart a single operating stroke to the cutting board and then to stop, hydraulic mechanism set into operation as an incident of the inward movement of the cutting board to produce an operating cycle of the ram, and electromagnetic means for operating said control mechanism comprising a switch for starting outward movement of the cutting board, said switch including a tripper made ready as an incident of downward movement of the ram and actuated at a predetermined point in the upward movement of the ram.

21. In a die press, in combination, a normally idle cutting board, a normally idle ram each movable relative to the other, driving mechanism for the cutting board constructed and arranged to be tripped and when tripped to drive the cutting board through a single horizontal stroke, manually operated tripping mechanism for initiating an inward stroke of the cutting board, power mechanism for actuating the ram, means operated as an incident of the inward stroke of the cutting board for producing a single full operating cycle of the ram, including a downward cutting stroke toward the cutting board and an upward return stroke, and mechanism responsive to the return stroke of the ram for causing the cutting board driving mechanism to effect an outward stroke of the cutting board and to conclude movement of the cutting board with the cutting board in its initial position.

22. In a die press, in combination, a cutting board, a normally idle ram, operating means for the cutting board including a half revolution clutch having a constantly running input member and a normally idle output member, control mechanism for the output member constructed and arranged to cause said member to impart a single operating stroke to the cutting board and then to stop, power mechanism set into operation as an incident of the inward movement of the cutting board to produce an operating cycle of the ram, and electromagnetic means for operating said control mechanism comprising a switch for starting outward movement of the cutting board, said switch including a tripper made ready as an incident of downward movement of the ram and actuated at a predetermined point in the upward movement of the ram.

23. In a die press operable from time to time to drive a die through a sheet stack in combination, a sheet stack supporting cutting board, a ram, means guiding the ram for vertical reciprocation hydraulically actuated pistons directly connected to operate the ram in opposite directions, upper and lower working cylinder chambers in which the respective pistons travel, a hydraulic mechanism for furnishing liquid under pressure to the cylinder chambers, said hydraulic mechanism comprising a closed pressure system which includes a normally closed control valve through which operating liquid under pressure is supplied from the closed system, and a pneumatic accumulator in which pressure is built up and liquid under pressure is accumulated between ram operations, a pressure regulator settable to determine the maximum pressure obtainable in the system in accordance with various work requirements so that the pressure, which is diminished during the cutting stroke of the ram, will remain adequate to complete the downward stroke without stalling, a liquid pump for delivering liquid under pressure, and mechanism responsive to the regulator for causing liquid to be forced into the pressure system from the pump when, but only when, the pressure in the system is below the maximum for which the pressure regulator is set, the control valve being shiftable to a first operating position to effect a downward cutting stroke of the ram and to a second or reverse operating position to effect an upward, retracting stroke of the ram, and mechanism responsive to the power operated downward movement of the ram at a predetermined point in the ram travel to cause the valve to be shifted from the first to the second working position to reverse the cylinder chamber connections and thereby to arrest and reverse the travel of the ram at a predetermined point.

24. In a blank dieing press for driving a discrete cutting die through a sheet stack, in combination, a stack supporting cutting board, a ram operable downward toward the stack to drive the cutting die down through the stack into contact with the cutting board and then to retreat, hydraulic mechanism for operating the ram including pneumatic means for supplying operating liquid under progressively diminishing pressure, means for adjusting said pneumatic means according to the resistance of the sheet stack to cause the stack penetration to be completed under diminished pressure, at diminishing speed, and with little reserve of power, upper and lower working cylinder chambers for depressing and restoring the ram, respectively, a discharge conduit, control valve mechanism common to the cylinder chambers and normally maintained in a neutral attitude but shiftable to a first working position to connect the upper working cylinder chamber to the supply of operating liquid under pressure for drawing the ram downward and to connect the lower working cylinder chamber concurrently to the discharge conduit, and shiftable to a second or reverse working position to connect the lower working cylinder chamber to the supply of operating liquid under pressure to drive the ram upward and to connect the upper working cylinder chamber concurrently to the discharge conduit; and mechanism responsive to the power operated downward movement of the ram at a predetermined position in the ram travel to cause the valve to be shifted from the first to the second working position to reverse the cylinder chamber connections and thereby to arrest and reverse the travel of the ram at a predetermined position as the cutting through of the stack is completed.

25. In a blank dieing press for driving a discrete cutting die through a sheet stack, in combination, a stack supporting cutting board, a stationary frame, a ram operable downward toward the stack to drive the cutting die down through the stack into contact with the cutting board and then to retreat, hydraulic mechanism directly connected to drive the ram downward to effect an operating stroke and to drive the ram upward to restore it to a normal upper position, pneumatic means for supplying operating liquid under progressively diminishing yielding pressure, means for adjusting said pneumatic means according to the resistance of the sheet stack to cause the stack penetration to be completed at diminishing speed and with little reserve of power, a control valve for the hydraulic mechanism normally maintained in a neutral position but shiftable to one operating position to produce downward operation of the ram and to a reverse operating position to produce upward operation of the ram, and cam mechanism responsive to the power operated downward movement of the ram at a predetermined position in the travel of the ram to effect reversal of the control valve, thereby to effect a reversal of travel of the ram at a predetermined position just as the cutting through of the stack is completed.

26. In a die press for dieing out envelope blanks from within the bounds of a stack of paper sheets, in combination, a cutting board for supporting the stack and a discrete die thereon, a ram operable downward toward the stack to drive the cutting die down through the stack into contact with the cutting board and then to retreat, hydraulic mechanism directly connected to operate the ram toward and from the cutting board, said hydraulic mechanism comprising a closed pressure system which includes a reversible control valve through which liquid under pressure is supplied selectively from the closed system for the operation of the ram either up or down, and a pneumatic accumulator in which pressure is built up between cutting operations and depleted during cutting, a pressure regulator responsive to pressure in said system and manually settable according to the resistance of the work to cause the ram to approach completion of the cut under diminishing pressure, at diminishing speed, and with little reserve of power, and when so set to determine a maximum pressure attainable in the system, mechanism responsive to the regulator for causing liquid to be forced into the pressure system only when the pressure in the system is below the maximum for which the pressure regulator is set, and means actuated by the ram at a predetermined position in the travel of the ram and operative on the control valve to reverse the valve, thereby to reverse the downward movement of the ram at a predetermined position just as the penetration of the stack is completed.

27. In a die press for dieing out envelope blanks from within the bounds of a stack of paper sheets, in combination, a cutting board for supporting the stack and a discrete die thereon, a ram operable downward toward the stack to drive the cuttting die down through the stack into contact with the cutting board and then to retreat, hydraulic mechanism directly connected to operate the ram, said hydraulic mechanism comprising a closed pressure system which includes a reversible control valve through which liquid under pressure is supplied for the operation of the ram, and a pneumatic accumulator in which pressure is built up between cutting operations and depleted during cutting, a pump for supplying liquid under pressure to the closed pressure system, said pump being incapable of supplying liquid under pressure at the rate at which it is utilized during ram operation, and said accumulator being capable of furnishing operating liquid far more rapidly than it is pumped by the pump, manually settable means for regulating the energy stored by the accumulator in accordance with the various predetermined, individual requirements for cutting through sheet stacks of different kinds, to cause the ram to approach completion of the cut under diminishing pressure, at diminishing speed, and with very little reserve of power, and means actuated by the ram at a predetermined position in the travel of the ram and operative on the control valve to reverse the valve, thereby to reverse the downward movement of the ram at a predetermined position just as the penetration of the stack is completed.

28. In a die press, in combination, a normally idle cutting board, a normally idle ram, each movable relative to the other, driving mechanism for the cutting board constructed and arranged to be tripped and when tripped to drive the cutting board through a single horizontal stroke, manually operated tripping mechanism for initiating an inward stroke of the cutting board, power mechansim for actuating the ram, means operated as an incident of the inward stroke of the cutting board for producing a single full operating cycle of the ram, including a downward cutting stroke toward the cutting board and an upward return stroke, mechanism coupled to the ram for operation in timed relation therewith, for causing the cutting board driving mechanism to initiate an outward stroke of the cutting board during the return stroke of the ram, said cutting board driving mechanism being automatically effective to conclude movement of the cutting board with the cutting board in its initial position.

29. In a die cutting press, a vertically reciprocable ram normally maintained in a raised position, a horizontally reciprocable cutting board for the support of a paper lift upon which a cutting die is required to be differently positioned for each cutting operation, the table being normally maintained in a retracted position until manually tripped, a manually operable tripping member, cutting board driving mechanism responsive to said tripping member to initiate a single inward stroke of the cutting board for carrying the die inward to a position of rest beneath the ram, ram operating mechanism adapted when tripped to effect a single complete operating cycle of the ram including a downward operating stroke and an upward return stroke, means operative as an incident of the inward stroke of the cutting board to trip the ram operating mechanism, means operative coincidently with the return stroke of the ram for causing the cutting board driving mechanism to initiate an outward stroke of the cutting board during the return stroke of the ram, and means automatically effective to cause outward movement of the cutting board to be terminated with the cutting board in its initial position.

30. In a die press, in combination, a normally idle cutting board, a normally idle ram, each movable relative to the other, driving mechanism for the cutting board constructed and arranged to be tripped and when tripped to drive the cutting board through a single horizontal stroke, manually operated tripping mechanism for initiating an inward stroke of the cutting board, power mechanism for actuating the ram, said mechanism comprising a continuously operating motor, means for receiving and storing energy supplied by said motor over a period of time, and means for causing said energy storing means to supply the stored energy to the actuation of the ram, means operated as an incident of the inward stroke of the cutting board for producing a single full operating cycle of the ram, including a downward cutting stroke toward the cutting board and an upward return stroke, said means comprising a transmission device for transmitting the stored energy from said energy storing means to the ram actuating mechanism, and means for tripping the transmission device so as to actuate the ram substantially upon completion by the table of its inward movement, and mechanism responsive to the return stroke of the ram for causing the cutting board driving mechanism to effect an outward stroke of the cutting board, and to conclude movement of the cutting board with the cutting board in its initial position.

31. In a die cutting press, a vertically reciprocable ram normally maintained in a raised position, a horizontally reciprocable cutting board for the support of a paper lift upon which a cutting die is required to be differently positioned for each cutting operation, the table being normally maintained in a retracted position until manually tripped, a manually operable tripping member, cutting board driving mechanism responsive to said tripping member to initiate a single inward stroke of the cutting board for carrying the die inward to a position of rest beneath the ram, said mechanism comprising a motor, members for operating the board in one direction or the other and a pair of clutch mechanisms for coupling the motor to the said members, to render one or the other of them effective to move the board, ram operating mechanism adapted when tripped to effect a single complete operating cycle of the ram including a downward operating stroke and an upward return stroke, means operative as an incident of the inward stroke of the cutting board to trip the ram operating mechanism, means operative coincidently with the return stroke of the ram for causing the cutting board driving mechanism to initiate an outward stroke of the cutting board during the return stroke of the ram, said means comprising a switch, and a cam for operating said switch, said cam being constructed and arranged to operate said switch shortly after the beginning of the upstroke of the ram operating mechanism, and means automatically effective to cause outward movement of the cutting board to be terminated with the cutting board in its initial position.

References Cited in the file of this patent

UNITED STATES PATENTS

| | | |
|---|---|---|
| 608,195 | Guild | Aug. 2, 1898 |
| 729,430 | Shem | May 26, 1903 |
| 891,626 | Loss | June 23, 1908 |
| 1,070,729 | Prime et al. | Aug. 19, 1913 |
| 1,469,689 | Prius | Oct. 2, 1923 |
| 1,616,856 | Huston | Feb. 8, 1927 |
| 1,647,254 | Simmons | Nov. 1, 1927 |
| 1,791,757 | Glasner | Feb. 10, 1931 |
| 1,859,058 | Stacy | May 17, 1932 |
| 1,871,272 | Jongedyk | Aug. 9, 1932 |
| 1,901,067 | Vickers | Mar. 14, 1933 |
| 2,176,543 | Norton | Oct. 17, 3939 |
| 2,224,956 | Ernst | Dec. 17, 1940 |
| 2,259,320 | Novick et al. | Oct. 14, 1941 |
| 2,278,713 | Riddle | Apr. 7, 1942 |
| 2,310,890 | Brandes | Feb. 9, 1943 |
| 2,339,959 | Stadlin | Jan. 25, 1944 |
| 2,377,262 | O'Leary | May 29, 1945 |
| 2,421,069 | Kelley | May 27, 1947 |
| 2,446,823 | Grant | Aug. 10, 1948 |
| 2,521,975 | Hartup | Sept. 12, 1950 |

FOREIGN PATENTS

| | | |
|---|---|---|
| 662 | Great Britain | Mar. 29, 1858 |